（12) United States Patent
Sun et al.

(10) Patent No.: US 10,778,545 B2
(45) Date of Patent: Sep. 15, 2020

(54) NETWORK VERIFICATION SYSTEM

(71) Applicant: Futurewei Technologies, Inc., Plano, TX (US)

(72) Inventors: Yan Sun, Santa Clara, CA (US); Wei Xu, Dublin, CA (US); Kun Tan, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 42 days.

(21) Appl. No.: 16/040,017

(22) Filed: Jul. 19, 2018

(65) Prior Publication Data

US 2020/0028762 A1  Jan. 23, 2020

(51) Int. Cl.
*H04L 12/26* (2006.01)
*H04L 12/24* (2006.01)

(52) U.S. Cl.
CPC .............. *H04L 43/04* (2013.01); *H04L 41/12* (2013.01); *H04L 43/06* (2013.01)

(58) Field of Classification Search
CPC ......... H04L 43/04; H04L 43/06; H04L 41/12; H04L 43/0805; H04L 43/0811; H04L 41/22; H04L 41/145; H04L 41/0813
See application file for complete search history.

(56) References Cited

U.S. PATENT DOCUMENTS

| | | | | |
|---|---|---|---|---|
| 7,359,328 B1* | 4/2008 | Allan | ................. | H04L 43/0811 370/236.2 |
| 7,453,886 B1* | 11/2008 | Allan | ................. | H04L 41/0866 370/395.5 |
| 9,225,601 B2* | 12/2015 | Khurshid | ............ | H04L 41/0866 |
| 2018/0077061 A1* | 3/2018 | Horn | ..................... | H04L 45/745 |
| 2018/0123911 A1* | 5/2018 | Zhang | ................. | H04L 41/5019 |
| 2018/0212886 A1* | 7/2018 | Contavalli | ............ | H04L 47/225 |
| 2018/0351845 A1* | 12/2018 | Horn | ................... | H04L 41/0873 |
| 2019/0036782 A1* | 1/2019 | Smith | ................... | H04L 41/147 |

(Continued)

OTHER PUBLICATIONS

Ball, Thomas, et al., "VeriCon: Towards Verifying Controller Programs in Software-Defined Networks", *PLDI '14*, Jun. 9-11, 2014, Edinburgh, United Kingdom, (Jun. 2014), 12 pgs.

(Continued)

*Primary Examiner* — Uzma Alam
(74) *Attorney, Agent, or Firm* — Schwegman Lundberg & Woessner, P.A.

(57) ABSTRACT

A network state is verified in real-time by precomputing a data structure representing header spaces of data packets in respective equivalence classes (ECs) in a first snapshot of the network and in a second snapshot of the network at a later time. The data structure includes respective bitmaps indicating for each data packet forwarding rule for each node in the network a forwarding action to be taken for each EC in the network. The respective bitmaps store bits indicating for each data packet forwarding rule whether the data packet forwarding rule applies to the respective ECs in the network. The snapshots are compared to identify network paths that have changed between a time of the first snapshot and the second snapshot of the network and network verification operations are performed on the changed network paths as a logical function of a bitmap corresponding to each changed network path.

20 Claims, 18 Drawing Sheets

(56) References Cited

U.S. PATENT DOCUMENTS

2019/0207843 A1* 7/2019 Horn ................... H04L 61/6018

OTHER PUBLICATIONS

Canini, Marco, et al., "A NICE Way to Test OpenFlow Applications", *NSDI '12*, Apr. 25-27, 2012, San Jose, CA, (Apr. 2012), 14 pgs.

Fayaz, Seyed K., et al., "BUZZ: Testing Context-Dependent Policies in Stateful Networks", *13th USENIX Symposium on Networked Systems Design and Implementation (NSDI '16)*, Mar. 16-18, 2016, Santa Clara, CA, (2016), 275-289.

Fogel, Ari, et al., "A General Approach to Network Configuration Analysis", *12th USENIX Symposium on Networked Systems Design and Implementation, (NSDI '15)*, (2015), 469-483.

Lopes, Nuno P., et al., "Checking Beliefs in Dynamic Networks", 12th USENIX *Symposium on Networked Systems Design and Implementation (NSDI '15)*, (2015), 499-512.

Stoenescu, Radu, et al., "SymNet: scalable symbolic execution for modern networks", *SIGCOMM '16*, Aug. 22-26, 2016, Florianopolis, Brazil, (2016), 14 pgs.

Bjørner, Nikolaj, et al., "ddNF: An Efficient Data Structure for Header Spaces", In: Bloem R., Arbel E. (eds) Hardware and Software: Verification and Testing. HVC 2016. Lecture Notes in Computer Science, vol. 10028. Springer, Cham, (2016), 49-64.

Kazemian, P., et al., "Real Time Network Policy Checking using Header Space Analysis", Proceedings of the 10th USENIX Conference on Networked Systems Design and Implementation (NSDI'13). Berkeley, CA, (2013), 99-112.

Kazemian, Peyman, et al., "Header Space Analysis: Static Checking for Networks", Proceedings of the 9th USENIX Conference on Networked Systems Design and Implementation (NSDI'12), San Jose, CA, (2012), 14 pgs.

Khurshid, Ahmed, et al., "VeriFlow: Verifying Network-Wide Invariants in Real Time", HotSDN'12, Aug. 13, 2012, Helsinki, Finland, (2012), 49-54.

Yang, Hongkun, et al., "Real-time Verification of Network Properties using Atomic Predicates", 2013 21st IEEE International Conference on Network Protocols (ICNP), (2013), 11 pgs.

Yang, Hongkun, et al., "Scalable Verification of Networks with Packet Transformers using Atomic Predicates", Department of Computer Science, University of Texas at Austin, Technical Report TR-16-12, revised version of TR-15-09, Oct. 2, 2015, (Aug. 16, 2016), 1-15.

* cited by examiner

| ARP TABLE | EXAMPLE |
|---|---|
| PROTOCOL | INTERNET |
| ADDRESS | 171.64.249.73 |
| AGE (MIN) | 69 |
| HW ADDR | 0014.36F4.43A5 |
| TYPE | ARPA |
| INTERFACE | FLAN2 |

*FIG. 4A*

| MAC TABLE | EXAMPLE |
|---|---|
| VLAN | 250 |
| MAC ADDR | 0014.36F4.43A5 |
| TYPE | STATIC |
| LEARN | YES |
| AGE | 85 |
| PORTS | GI4/5, GI4/6 |

*FIG. 4B*

| ROUTE TABLE | EXAMPLE |
|---|---|
| PREFIX | 10.4.6.0/24 |
| NEXT HOP | 0014.36F4.43A5 |
| INTERFACE | VLAN2 |

*FIG. 4C*

| CONFIG ACL | EXAMPLE |
|---|---|
| RULE SET NUMBER | 3 |
| ACTION | PERMIT |
| TYPE | IP |
| SRC ADDRESS | 172.20.1.0/24 |
| DST ADDRESS | ANY |

*FIG. 4D*

| SPANNING TREE | EXAMPLE |
|---|---|
| INTERFACE | GI4/9 |
| ROLE | DESG |
| STS | FWD |
| COST | 4 |
| PRIO.NBR | 128.393 |
| TYPE | P2P |

*FIG. 4E*

NETWORK VERIFICATION SYSTEM

TECHNICAL FIELD

This application is directed to a network verification system and, more particularly, to systems and methods of verifying a network state in real-time by determining a compressed data structure including bitmaps representing header spaces of data packets in an original snapshot of the network and in a real-time snapshot of the network. Network verification operations are performed on the differences between the snapshots as a logical function of bitmaps corresponding to each network path impacted by the differences.

BACKGROUND

Switches and routers generally operate by indexing into a forwarding table using a destination address and deciding where to send a received packet. In recent years, such forwarding has grown more complicated. Middle boxes (e.g., network address translators (NATs) and firewalls) and encapsulation mechanisms (e.g., virtual local area networks (VLANs) and multiprotocol label switching (MPLS) devices) have been developed to escape some of the limitations of internet protocol (IP). For example, NAT bypasses address limits and MPLS allows flexible routing. Further, new protocols for specific domains, such as data centers, wide area networks (WANs) and wireless, have greatly increased the complexity of packet forwarding. Today, there are over 6,000 Internet Requests for Comment (RFCs) and it is not unusual for a switch or router to handle ten or more encapsulation formats simultaneously.

This complexity makes it increasingly difficult to operate a large network. Network operators require great sophistication to master the complexity of many interacting protocols and middle boxes. The complexity makes network operators wary of trying new protocols, even if they are available, for fear of breaking their network. Complexity also makes networks fragile, and susceptible to problems where hosts become isolated and unable to communicate. Moreover, debugging reachability problems is very time consuming. Even simple questions such as "Can Host A talk to Host B?" or "Can packets loop in my network?" or "Can User A listen to communications between Users B and C?" are difficult to answer. These questions are especially hard to answer in networks carrying multiple encapsulations and containing boxes that filter packets.

The process of forwarding packets is prone to faults from configuration errors and unexpected protocol interactions. In large packet networks, forwarding tables in routers/switches are updated by multiple protocols. Access control lists (ACLs) in routers, switches, and firewalls are designed and configured by different people over a long period of time. Links may be physical or virtual (e.g., VLAN, MPLS). Some middle boxes also modify packets (e.g., NAT). For at least these reasons, despite being mission-critical for most organizations, managing a network is surprisingly difficult.

In large scale data centers, protocol changes are frequent and operators usually do not have a full picture of the network. The result is common and expensive misconfigurations. Given a set of high level requirements (e.g., reachability, security), network operators need to precisely understand:

(i) the behavior of the protocols (often distributed);
(ii) how the protocols interact with each other; and
(iii) how each parameter in the configuration affects the distributed computation.

The network operators then manually figure out the individual configurations of potentially hundreds of devices running complex distributed protocols so that they may compute a forwarding state compatible to high level requirements. Because of this complexity, network operators often make mistakes that can lead to severe network downtimes. Indeed, studies show that most network downtimes are caused by humans, not equipment failures.

Also, network state may change rapidly in response to customer demands, load conditions, or configuration changes. For example, networks are subject to dynamic state changes over time as a result of rule insertion and deletion by protocols and operators, failure and recovery of links and boxes, etc. Network status is read and network atomic flows are generated based on different types of rules. As used herein, data packets in the same atomic flow or equivalence class (EC) have the same behavior in the network. Existing systems address these issues by separating the forwarding table and the ACL and by reducing redundancy in the forwarding table and the ACL. The network must also ensure correctness conditions such as isolating tenants from each other and from critical services. However, existing policy checkers cannot verify compliance in real-time because of the need to collect "state" from the entire network and the time it takes to analyze this state.

As computer networks become more and more complex, an automatic network review tool that takes the network's forwarding state as input, summarizes the overall state, and generates some general reports about the reachability relationship, the key point, the duplicated routes, or back-up routes of the network becomes increasingly desirable. Also, when network operators need to switch the configuration of a network into a new configuration, a general difference report of the two configurations is desirable for facilitating the configuration changes. It is further desirable that the network analyzing tool also strengthen the operator's capability to better administer the network.

Existing network verification or analysis methods mainly focus on single point analysis and verification. Few network verification or analysis methods evaluate the network as a whole and provide an overall "review" function. Those network verification or analysis methods that do provide whole network analysis functionality do so by traversing all possible node pairs or paths and verifying them one by one, which costs lots of time and space.

A system identified as Veriflow is described by Khurshid et al. in "Veriflow: Verifying Network-Wide Invariants in Real Time," in HotSDN, 2012, purports to provide a layer between a software-defined networking controller and network devices to check for network-wide invariant solutions dynamically in real-time as each forwarding rule is inserted, modified, or deleted. By checking each change to forwarding behavior before it takes effect, Veriflow purports to block changes that may violate important invariants (e.g., prohibit changes that violate access control policies or cause forwarding loops).

Veriflow uses the approach of data plane verification since the data-plane state has relatively simple formats and semantics that are common across many higher-layer protocols and implementations and thus simplifies rigorous analysis of a network. In routing, the data plane defines the part of the router architecture that decides what to do with packets arriving on an inbound interface. Generally, the data plane refers to a table in which the router looks up the destination address of the incoming packet and retrieves the rules and other information necessary to determine the path from the receiving element, through the routing device, and to the proper outgoing interface. Depending upon the router implementation, the table in which the destination is looked up could be the routing table (or routing information base (RIB)) or a separate forwarding information base (FIB) that is loaded by the routing control plane but used by the data plane for higher speed lookups. Before or after examining the destination, other tables may be consulted to make decisions to drop the packet based on other considerations, such as the source address, the IP protocol identifier field, the Transmission Control Protocol (TCP), or User Datagram Protocol (UDP) port number.

Veriflow verifies the effect of rules on the network by slicing the network into a set of equivalence classes (ECs) of packets. Like an atomic flow, each EC is a set of packets that experience the same forwarding actions throughout the network. Veriflow takes advantage of the fact that each change to the network will typically only affect a small number of ECs to find the set of ECs whose operation could be altered by a rule and to verify network invariants only within those ECs. Veriflow also builds forwarding graphs for every modified EC to represent the network's forwarding behavior and traverses the forwarding graphs to determine the status of one or more invariants.

In operation, Veriflow verifies network properties by preparing a model of the entire network using its current data-plane state and runs queries on this model. For example, FIG. 1A illustrates an original network while FIG. 1B illustrates a network model as a data-plane higher level abstraction. As illustrated, the network elements are abstracted as switches ($T_{switch}$) 10, routers ($T_{router}$) 12, 14, firewalls ($T_{firewall}$) 16, and MPLS devices ($T_{MPLS}$) 18. The network is then sliced into a set of ECs based on the new rule and the existing rules that overlap the new rule. Veriflow implements a multi-dimensional prefix tree (trie) to store new network rules, to find overlapping rules, and to compute the affected ECs. A trie is an ordered tree data structure that stores an associative array. The trie associates the set of packets matched by a forwarding rule with the forwarding rule itself. Each level in the trie corresponds to a specific bit in a forwarding rule, which is equivalent to a bit in the packet header. Each node in the trie has three branches, corresponding to three possible values that the rule can match: 0, 1, and * (wildcard). The trie is characterized as a composition of several sub-tries or dimensions, each corresponding to a packet header field. A path from the trie's root to a leaf of one of the bottommost sub-tries represents a set of packets that a rule matches. Each leaf stores the rules that match that set of packets and the devices at which they are located.

When a new forwarding rule is generated by an application, a lookup in the trie is performed by traversing it dimension by dimension to find all the rules that intersect the new rule. At each dimension, the search area is narrowed down by only traversing those branches that fall within the range of the new rule using the field value of that particular dimension. The lookup procedure results in the selection of a set of leaves of the bottommost dimension, each with a set of forwarding rules. These rules collectively define a set of packets (in particular, their corresponding forwarding rules) that could be affected by the incoming forwarding rule. This set may span multiple ECs. For each field, a set of disjoint ranges (lower and upper bound) is found such that no rule splits one of the ranges. An EC is then defined by a particular choice of one of the ranges for each of the fields.

For each computed EC, Veriflow generates a forwarding graph. Each such graph is a representation of how packets within an EC will be forwarded through the network. In the graph, a node represents an EC at a particular network device, and a directed edge represents a forwarding decision for a particular EC or device pair. Specifically, an edge X→Y indicates that according to the forwarding table at node X, packets within this EC are forwarded to Y. To build the graph for each EC, the trie is traversed a second time to find the devices and rules that match packets from that EC. The second traversal is needed to find all those rules that were not necessary to compute the affected ECs in the first traversal, yet can still influence their forwarding behavior. In this fashion, Veriflow only has to traverse those branches of the trie having rules that can match packets of that particular EC.

Thus, Veriflow models the behavior of the network using forwarding graphs built only for those ECs whose behavior may have changed. The forwarding graphs are then used to check conditions concerning network behavior, such as reachability (whether packets will be delivered to the destination address specified in the rule), loop detection, consistency, "black holes" where packets are dropped, isolation, verification of access control policies, whether a new rule conflicts with an existing rule, whether an EC changes its next hop due to the insertion/deletion of a rule, whether a packet will always traverse a firewall, and the like.

However, the effectiveness of the Veriflow approach is limited by a number of factors including the complexity of the verification functions, the size of the network, the number of rules in the network, the number of unique ECs covered by a new rule, the number of header fields used to match packets by a new rule, and the like. The most important factor for verification time is the number of ECs modified. The verification time is roughly linearly related to the number of ECs modified, and Veriflow has difficulty verifying invariants in real-time when large portions of the network's forwarding behavior are altered in one operation. Thus, though Veriflow purports to verify network invariants in real-time, the Veriflow system is generally too slow to meet real-time network verification requirements in large-scale networks.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

Systems and methods are provided that perform network data-plane verification for complicated networks in real-time without the inherent delays introduced by systems such as the Veriflow system. In sample embodiments, the system and method pre-computes a compressed data structure representing the relevant header spaces instead of the "run-time" compression, thereby saving time, saving memory usage, and avoiding redundant computing. These compact data structures store rules and generate less atomic flows than conventional systems. Also, different data structures are provided for forwarding rules and ACL rules because they have very different properties and achieve better performance and less memory consumption. Port-based forwarding graphs are used instead of rule-based or node-based forwarding graphs. The resulting system allows faster incremental verification instead of recalculation and can easily verify reachability, loop detection and isolation at the same time with the reachability tree database and can provide a fast query about reachability between any two nodes, which improves the ease of debugging. The systems and methods described herein thus can achieve real-time checking and monitoring of the status of a network based on the network operator's intent. Calculated values are reused for better performance and stored in a bitmap to take up less memory.

According to one aspect of the present disclosure, there is provided a method of verifying a state of a network comprising a plurality of nodes having data packet forwarding rules by generating, with one or more processors, at a first time a first data structure representing a header space of data packets in respective equivalence classes (ECs) of data packets in a first snapshot of the network and generating, with the one or more processors, at a second time later than the first time a second data structure representing a header space of data packets in the respective ECs of data packets in a second snapshot of the network. Each of the data structures includes a respective bitmap indicating for each data packet forwarding rule for each node a forwarding action to be taken for each EC of data packets in the network. The respective bitmap stores bits indicating for each data packet forwarding rule whether the data packet forwarding rule applies to the respective ECs of data packets in the network. The first snapshot is compared to the second snapshot of the network to identify network paths that have changed between a time of the first snapshot and the second snapshot of the network, and network verification operations are performed on the changed network paths as a logical function of a bitmap corresponding to each changed network path.

According to another aspect of the present disclosure, there is provided a network unit that verifies a state of a network comprising a plurality of nodes having data packet forwarding rules. The network unit includes a receiver that receives data packets from the network, a transmitter that forwards data packets to other network components, a memory that stores instructions, and one or more processors in communication with the memory, wherein the one or more processors execute the instructions to determine a status of the network. Execution of the instructions by the one or more processors cause the one or more processors to generate at a first time a first data structure representing a header space of data packets in respective equivalence classes (ECs) of data packets in a first snapshot of the network and to generate at a second time later than the first time a second data structure representing a header space of data packets in the respective ECs of data packets in a second snapshot of the network. The first snapshot is compared with the second snapshot of the network to identify network paths that have changed between a time of the first snapshot and the second snapshot of the network. Network verification operations are performed on the changed network paths as a logical function of a bitmap corresponding to each changed network path. Each of the data structures comprises a respective bitmap indicating for each data packet forwarding rule for each node a forwarding action to be taken for each EC of data packets in the network, and the respective bitmap stores bits indicating for each data packet forwarding rule whether the data packet forwarding rule applies to the respective ECs of data packets in the network.

According to still another aspect of the present disclosure, there is provided a non-transitory computer-readable media storing computer instructions implementing verification of a state of a network comprising a plurality of nodes having data packet forwarding rules. The instructions, when executed by one or more processors, cause the one or more processors to perform the steps of: generating at a first time a first data structure representing a header space of data packets in respective equivalence classes (ECs) of data packets in a first snapshot of the network and generating at a second time later than the first time a second data structure representing a header space of data packets in the respective ECs of data packets in a second snapshot of the network. The first snapshot is compared with the second snapshot of the network to identify network paths that have changed between a time of the first snapshot and the second snapshot of the network. Network verification operations are performed on the changed network paths as a logical function of a bitmap corresponding to each changed network path. Each of the data structures comprises a respective bitmap indicating for each data packet forwarding rule for each node a forwarding action to be taken for each EC of data packets in the network, and the respective bitmap stores bits indicating for each data packet forwarding rule whether the data packet forwarding rule applies to the respective ECs of data packets in the network According to yet another aspect of the present disclosure, there is provided a network unit that verifies a state of a network comprising a plurality of nodes having data packet forwarding rules. The network unit includes a receiver that receives data packets from the network, a transmitter that forwards data packets to other network components, a memory that stores instructions, and one or more processors that include modules that determine a status of the network. A first software module generates at a first time a first data structure representing a header space of data packets in respective equivalence classes (ECs) of data packets in a first snapshot of the network and at a second time later than the first time a second data structure representing a header space of data packets in the respective ECs of data packets in a second snapshot of the network. Each of the data structures comprises a respective bitmap indicating for each data packet forwarding rule for each node a forwarding action to be taken for each EC of data packets in the network. The respective bitmap stores bits indicating for each data packet forwarding rule whether the data packet forwarding rule applies to the respective ECs of data packets in the network. A second software module compares the first snapshot with the second snapshot of the network to identify network paths that have changed between a time of the first snapshot and the second snapshot of the network. A third software module performs network verification operations on the changed network paths as a logical function of a bitmap corresponding to each changed network path.

Optionally, in any of the preceding embodiments, each header space is split into two fields FW1 and FW2 based on a combination of data packet forwarding rules used to generate respective ECs. The fields FW1 and FW2 are combined to generate a combined EC graph of network-wide packet behaviors for different combinations of overlapping data packet forwarding rules for all EC combinations for FW1 and FW2. Each different combination of overlapping data packet forwarding rules represents an EC corresponding to a path through the network.

Optionally, in any of the preceding embodiments, each bitmap is generated for respective output ports of at least one of the nodes. Each bitmap stores bits indicating which ECs apply which data packet forwarding rule at output ports of the at least one node represented by the respective bitmap.

Optionally, in any of the preceding embodiments, the data packet forwarding rules for at least one of the nodes are checked one by one in a priority order until a rule match is found for a particular data packet of a particular EC.

Optionally, in any of the preceding embodiments, each bit in each bitmap represents one of the ECs where actions to be taken for each data packet for the EC are to output the data packet based on a matched data packet forwarding rule or to drop the packet.

Optionally, in any of the preceding embodiments, performing network verification operations comprises determining reachability from a first node to a second node by logically ANDing the bitmaps for each network path from the first node to the second node to produce a result bitmap. In this case, a bit of the result map being logical "1" for a particular EC as a result of the AND operation indicates that the network path for the particular EC is a valid path from the first node to the second node.

Optionally, in any of the preceding embodiments, performing network verification operations comprises determining if a loop exists from one of the nodes through the network back to the one node by logically ANDing the bitmaps for each network path and return network path from the one node and back to the one node to produce a result bitmap. In this case, a bit of the result bitmap being logical "1" for any EC indicates that a loop exists via that EC back to the one node.

Optionally, in any of the preceding embodiments, the first and second data structures store data packet forwarding rules in a binary decision diagram having nodes, each node representing an EC which has a value equal to its value minus a value of each child of the respective node. Each binary decision diagram generates a trie that branches on one or more bits at a time.

Optionally, in any of the preceding embodiments, the first and second data structures store access control list rules in a binary decision diagram having nodes, each node representing an EC which has a value equal to its value minus a value of each child of the respective node. Each binary decision diagram generates a trie that branches on one or more bits at a time.

Optionally, in any of the preceding embodiments, the network unit stores data packet forwarding rules and access control list rules in the first and second data structure to map reachability between input ports and output ports of the router.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 4A illustrates an address resolution protocol (ARP) table of the input data.

FIG. 4B illustrates a forwarding information base (FIB) or a media access control (MAC) table that provides a station's MAC address in the input data.

FIG. 4C illustrates a route table of the input data.

FIG. 4D illustrates configuration tables of the input data.

FIG. 4E illustrates a spanning tree that is used to find a list of ports that are in a forwarding mode for each virtual local area network (VLAN) of the input data.

DETAILED DESCRIPTION

Figure 1A:
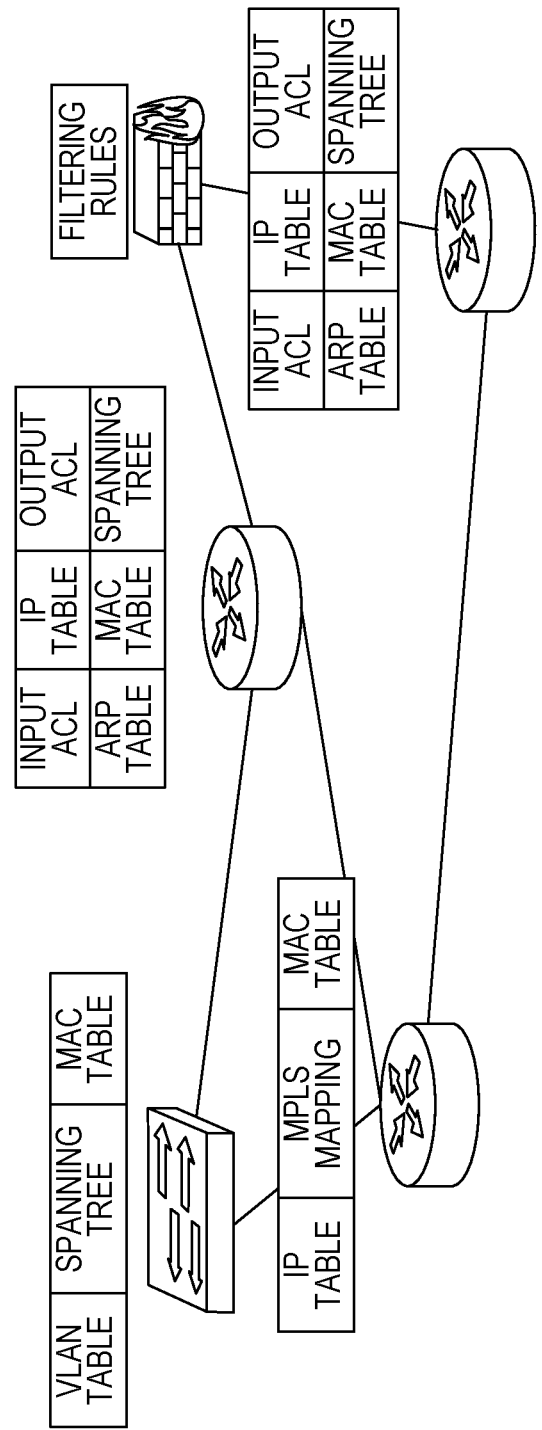
FIG. 1A illustrates a sample network.
Figure 1B:
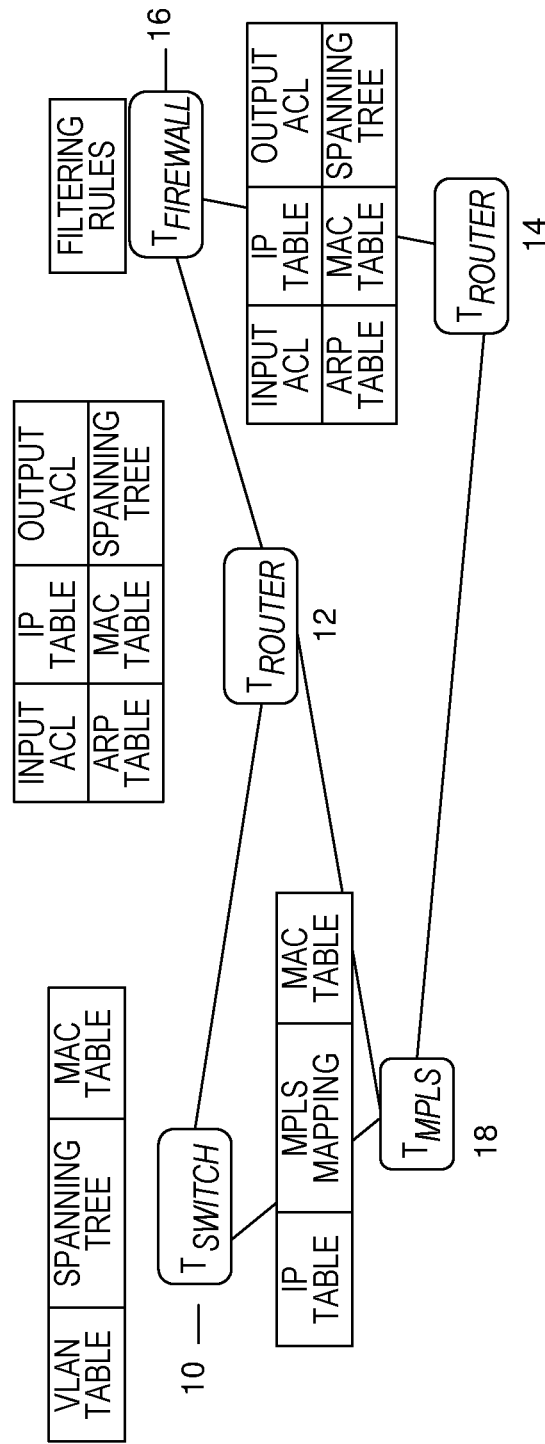
FIG. 1B illustrates a network model as a data-plane higher level abstraction of the sample network of FIG. 1A.

In the following description, reference is made to the accompanying FIGS. 1-17 that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

An efficient network verification system and method verifies even complicated networks in real-time by providing an efficient data structure to store network policies and algorithms to process flows. Data plane verification is used because the data plane is closely tied to the network's actual behavior, so that it can catch bugs that other tools miss. For example, configuration analysis cannot find bugs that occur in router software. Also, the data plane state has relatively simple formats and semantics that are common across many higher-layer protocols and implementations, thus simplifying rigorous analysis of a network. With a goal of real-time verification, the data plane state is processed in sample embodiments to verify network status such as:

Reachability
Loop Detection
Isolation
Black hole
Waypoint
Consistency
Link up/down The methods described herein improve the efficiency of data plane data structures by focusing on all-pair reachability generation to replace reachability tree generation and pre-computing a compressed representation of the relevant header spaces instead of relying upon "run-time" compression. The compact data structures defined herein store rules and generate less atomic flows and provide different data structures for forwarding rules and ACL rules because they have very different properties and achieve better performance and less memory consumption. Also, port-based forwarding graphs are used instead of rule-based or node-based forwarding graphs. The result is a method that allows faster incremental verification instead of recalculation. As explained below, the system and method described herein can easily verify reachability, loop detection and isolation at the same tune with the reachability tree database and can provide fast query about reachability between any two nodes.

Figure 2:
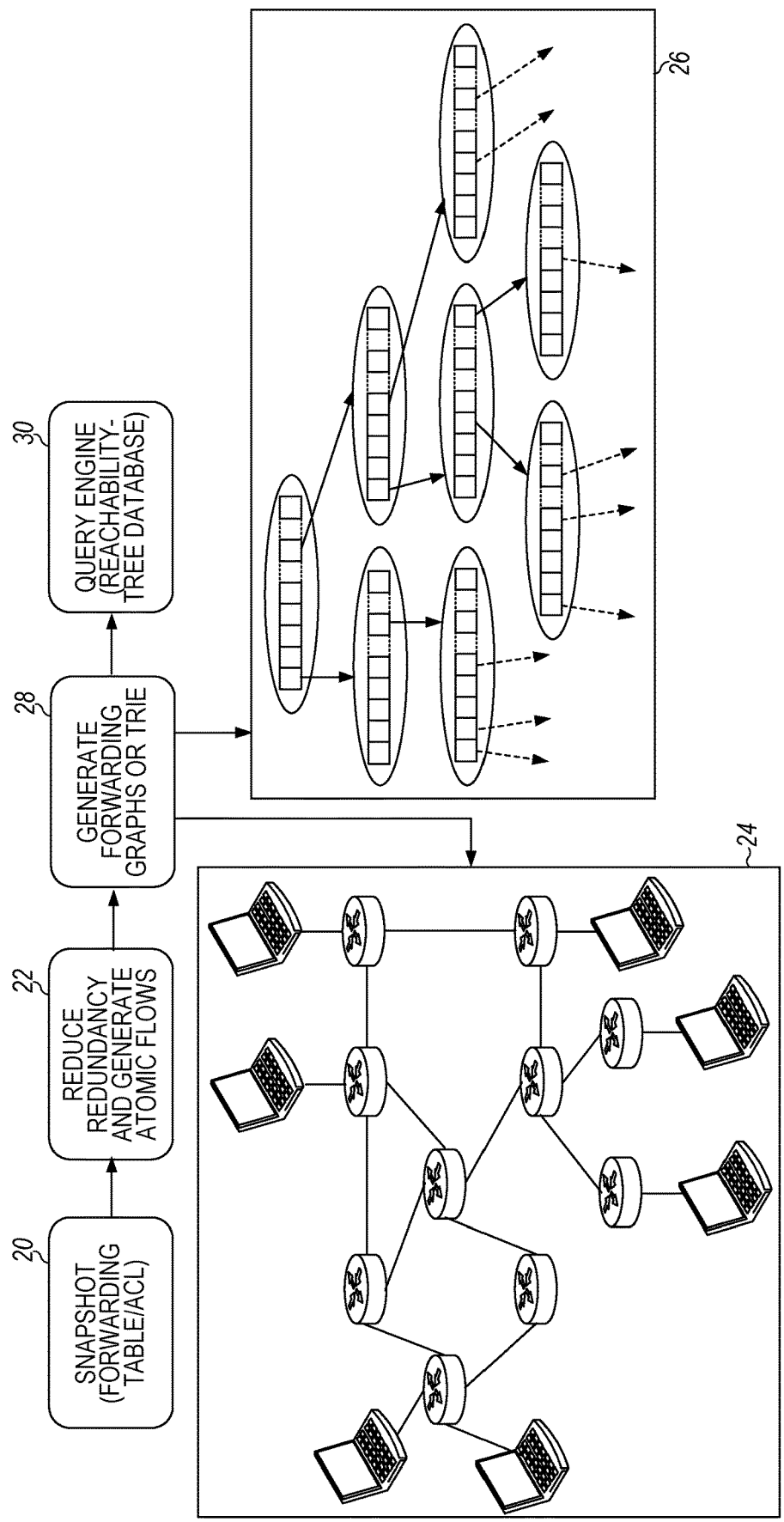
FIG. 2 illustrates the overall architecture of a sample data-plane network verification system of a sample embodiment.

The overall architecture of a sample data-plane network verification system of a sample embodiment is shown in FIG. 2. As illustrated in FIG. 2, the network verification system and method forwards a snapshot 20 of the state of the network at a point in time. In sample embodiments, the snapshot 20 includes a copy of the forwarding table and access control list (ACL) at the point in time. The network verification system and method then reduces any redundancies and generates atomic flows at 22 for the identified equivalence classes (ECs) using techniques such as those described in the afore-mentioned Veriflow article. The network verification system and method then generates forwarding graphs 24 and trie 26 at 28. However, while the Veriflow system generates a graph for each EC, the network verification system and method described herein generates a compact port based forwarding graph that stores the rules and generates less atomic flows to enable faster incremental verification instead of recalculation while using less memory. The network verification system and method further enables an operator to query the status of the network using a query engine at 30.

Figure 3:
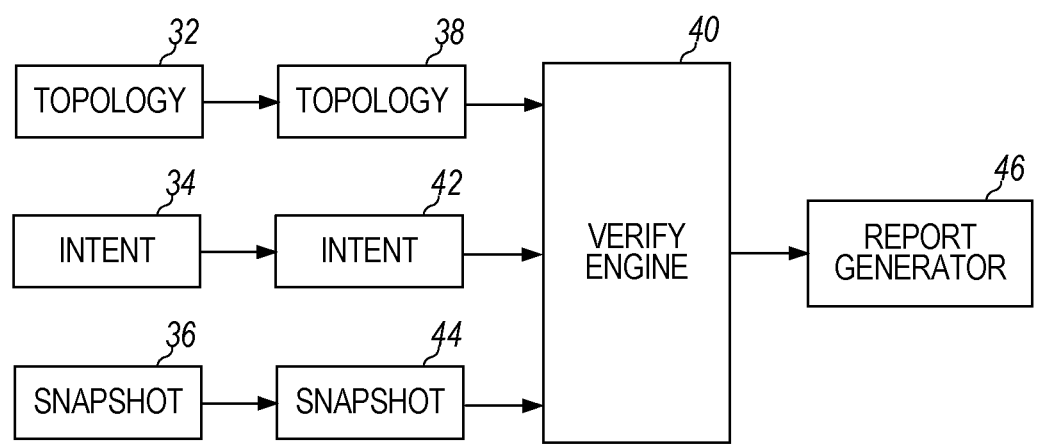
FIG. 3 illustrates the input/output modules of the network verification system of FIG. 2.

The input/output modules of the network verification system of FIG. 2 are shown in FIG. 3. As illustrated, the network operator specifies the topology 32 of the network, the intent 34 of the network verification (e.g., what to check for), and the snapshot policy 36 specifying the forwarding state information. The topology 32 is parsed by topology parser 38 and provided to the verify engine 40. Similarly, the intent 34 is parsed by intent parser 42, the snapshot policy 36 is parsed by the snapshot parser 44, and the parsed intent and snapshot data is provided to the verify engine 40. As explained below with respect to FIG. 5, the verify engine 40 provides calculated verification data to report generator 46 to generate a network status report for the operator.

In sample embodiments, the input data indicative of the data-plane state of the network is provided by the input modules 32, 34, and 36. The input data is collected from network devices using simple network management protocol (SNMP), secure shell (SSH) cryptographic network protocol, and the like. FIGS. 4A-4E illustrate a sample snapshot of a physical network. The input data input data may include an address resolution protocol (ARP) table as shown by way of example in FIG. 4A, a forwarding information base (FIB) or a media access control (MAC) table that provides a station's MAC address as shown by way of example in FIG. 4B, a route table as shown by way of example in FIG. 4C. ACL configuration tables as shown by way of example in FIG. 4D, and a spanning tree that is used to find a list of ports that are in a forwarding mode for each virtual local area network (VLAN) as shown by way of example in FIG. 4E.

Figure 5:
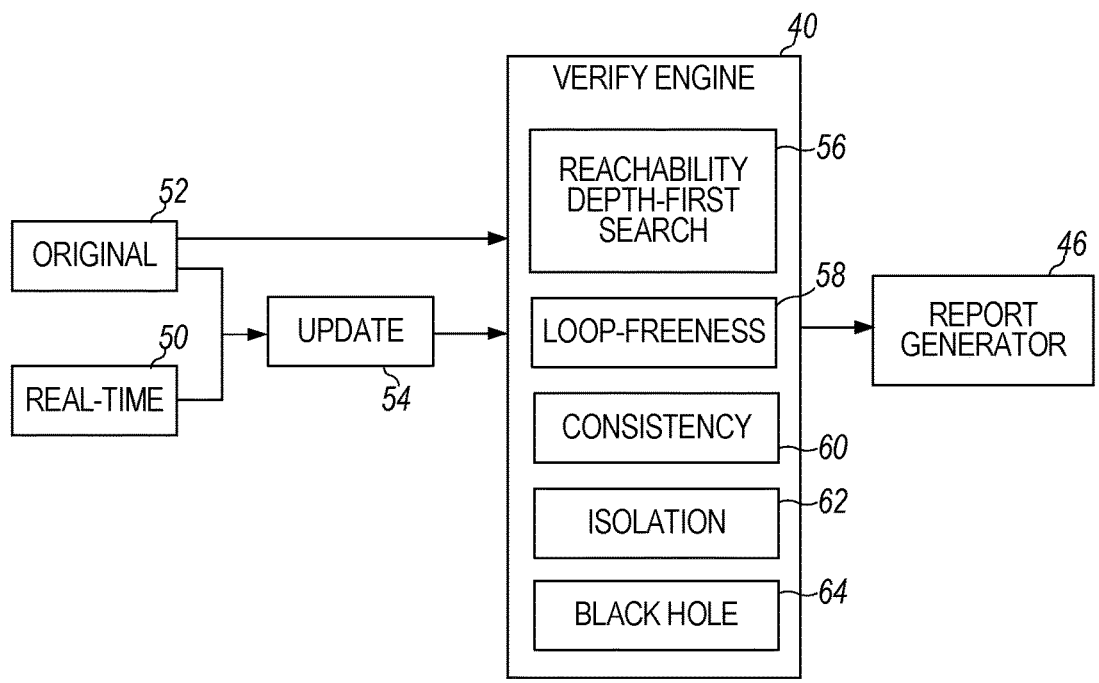
FIG. 5 illustrates the architecture for incremental verification using a verify engine that compares a real-time snapshot of the network with an original snapshot of the network in a sample embodiment.

From the snapshot of the physical network, an initial verification process looks for differences between snapshots taken at different times. For example, as shown in FIG. 5, the verify engine 40 compares the real-time snapshot 50 with an original snapshot 52 at the update engine 54 using the techniques described below to look for differences between the real-time snapshot 50 and the original snapshot 52. Any differences are forwarded to the verify engine 40, which implements algorithms to perform verification operations such as reachability 56, loop-freeness 58, consistency 60, isolation 62, and black hole identification 64 and to provide outputs to report generator 46. In sample embodiments described below, these embodiments are simplified by using bitmaps that allow for simple logical processing of the network paths during the verification operations.

In sample embodiments, to achieve real-time speed, the system and method described herein pre-computes a compressed representation of the relevant header spaces instead of the "run-time" compression employed while answering reachability queries. This transformation turns large network EC graphs into small tractable sizes for quantitative analyses and allows faster incremental verification than a binary decision diagram (BDD) based approach where the data structure is used to represent a Boolean function and the BDD is a compressed representation of the sets or relations.

Figure 6:
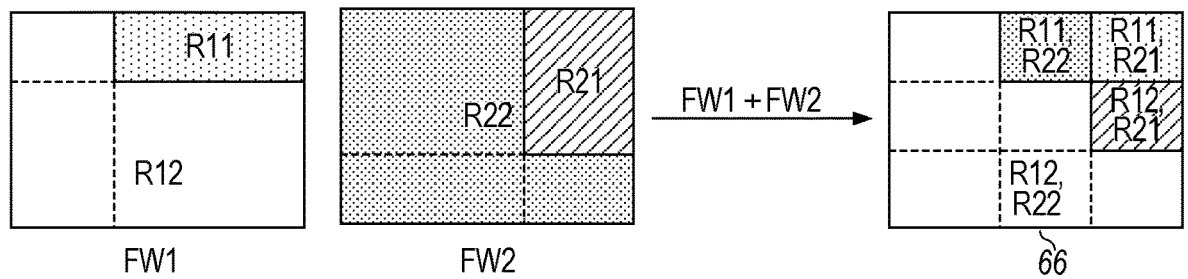
FIG. 6 illustrates the use of an EC graph to represent rules at a given node for forwarding a packet to another node in a network.

FIG. 6 illustrates the use of EC graphs to represent rules at a given node for forwarding a packet to another node in a network. In the following description, the sets of headers are represented succinctly as equivalence classes (ECs) where the EC includes packets where the forwarding action is identical for each packet in the EC at a network device.

Those skilled in the art will appreciate that the terms "atomic" or "atomic flow (AF)" may also be used instead of EC to represent the same concepts. Each EC only matches one rule in each device, so when checking one EC from a start node (device), it only has one path in the whole network. As a result, ECs and atomic flows are a convenient way to analyze all packet behaviors in an entire network.

To generate ECs, all rules from different nodes are combined together and the whole header space is cut/split. In FIG. 6, for example, the header space is cut/split into two fields FW1 and FW2. The header space is usually split based on the rules in one network device; however, in this example, the rules are combined together to generate the ECs. As illustrated in FIG. 6, the first field FW1 includes Rules $R_{11}$ and $R_{12}$ that are applied for the ports governed by the respective forwarding rules. Similarly, the second field FW2 includes Rules $R_{21}$ and $R_{22}$ that are applied for the ports governed by the respective forwarding rules. In accordance with the systems and methods described herein, a combined EC graph is used to represent the rules for the ECs in the network in a compressed representation. For example, as illustrated in FIG. 6, FW1 and FW2 are combined to create an EC graph 66 that identifies four different ECs: $(R_{12},R_{22})$, $(R_{12},R_{21})$, $(R_{11},R_{22})$, and $(R_{11},R_{21})$.

As will be described with respect to FIG. 7 and FIG. 8 below, the combined EC graph of FIG. 6 is used to generate bitmaps of compressed EC representations of a given network configuration in a sample embodiment.

Based on the network topology, the bitmap as described herein may be used to iterate all possible paths between any two nodes in a network. For example, FIG. 7 illustrates a simple example of a network 70 having two paths from node A to node C. The first path extends directly from port A3 of node A to port C1 of node C, while the second path extends from port A2 of node A to port B1 of node B and from port B3 of node B to port C2 of node C. For each path, "AND" logic to is used to find ECs that can pass through each of the nodes on the path. If the result of the AND of the ECs for each path is not all zeros, then the remaining ECs can go through the non-zero paths from node A to node C. On the other hand, if the result of the AND of the ECs is zero, the path is isolated between node A and node B. If all the paths are all zeros, node A and node C are isolated. This kind of network verification is only a formal verification. There is no need to send packets in the network. Rather, one only needs to collect forwarding tables and to verify the logic.

Figure 7:
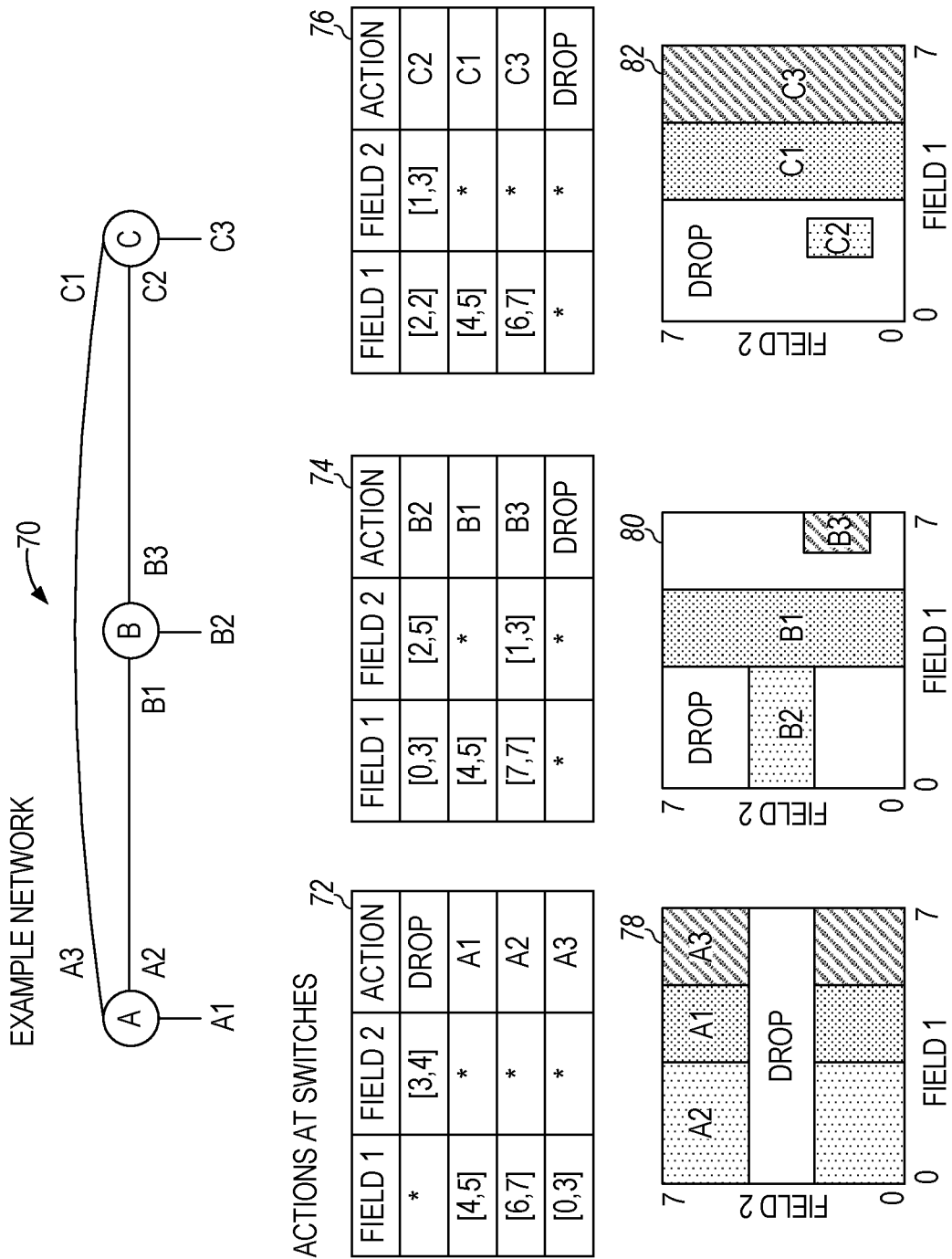
FIG. 7 illustrates an example of a verification engine design for a simple sample network in a sample embodiment.

FIG. 7 further illustrates an example of a verification design engine for the sample network including nodes A, B, and C. The example in FIG. 7 is based on a simple ACL policy of four rules illustrated in Table 1 below. In this example, tuples/fields in a packet header are considered: Type, Source IP (SIP), Destination IP (DIP), Source Port, and Destination Port:

TABLE 1

| Rule | Type | Source IP | Destination IP | Source Port | Destination Port | Decision |
|---|---|---|---|---|---|---|
| $r_1$ | TCP | * | 192.168.0.0/16 | <1024 | * | accept |
| $r_2$ | TCP | * | 192.168.14.1 | * | 139 | discard |
| $r_3$ | UDP | 192.168.0.0/16 | * | * | 700:900 | accept |
| $r_4$ | TCP | * | * | * | * | discard |

The goal of Table 1 is to map each packet to a decision according to a sequence of rules.

It will be appreciated by those skilled in the art that two rules in a packet classifier may overlap, which means that one packet may match two or more rules. In addition, two rules in a packet classifier may conflict with each other. In other words, two overlapping rules may lead to different decisions. Conflicts are typically resolved by employing the first match, which has higher priority. Thus, when trying to match a rule, the rules are checked one by one from the first rule until a match is found. In this fashion, one packet can only match one rule and cannot match multiple rules. As a result, in the bitmap to be described below with respect to FIG. 7 and FIG. 8, if an EC has already matched any rules, it should not be matched or used later to remove any possible overlap between bitmaps.

In FIG. 7, the respective tables 72, 74, 76 illustrate the actions or work flow at respective switches (nodes A, B, and C) in the example network. In particular, the respective tables 72, 74, 76 show application of the above four rules by the respective switches. For example, at node A, rule $r_1$ provides that all bits at the source ports (Field1) (a "*" indicates all ports) that are passed to destination ports (Field2) 3 and 4 are to be dropped. Rule $r_2$ provides that all bits at source ports 4 and 5 are represented by EC A1 for all destination ports. Similarly, rule $r_3$ provides that all bits at source ports 6 and 7 are represented by EC A2 for all destination ports, and rule $r_4$ provides that all bits at source ports 0 and 3 are represented by EC A3 for all destination ports. The resulting EC graph 78 for node A is shown below the table 72 for node A. Since rule $r_1$ appears first and thus has priority over the other rules, all packets passed to ports 3 and 4 are dropped.

At node B, rule $r_1$ provides that all bits at source ports (Field1) 0 and 3 are passed to destination ports (Field2) 2 and 5 in accordance with EC B2. Rule r7 provides that all bits at source ports 4 and 5 are represented by EC B1 for all destination ports. Rule $r_3$ provides that all bits at source port 7 are passed to destination ports 1 and 3 in accordance with EC B3. Rule r4 provides that all remaining bits are dropped for all source and destination ports. The resulting EC graph 80 for node B is shown below the table 74 for node B.

At node C, rule $r_1$ provides that all bits at source port (Field1) 2 are passed to destination ports (Field2) 1 and 3 in accordance with EC C2. Rule $r_2$ provides that all bits at source ports 4 and 5 are represented by EC C1 for all destination ports. Rule $r_3$ provides that all bits at source ports 6 and 7 are represented by EC C3 for all destination ports. Rule $r_4$ provides that all remaining bits are dropped for all source and destination ports. The resulting EC graph 82 for node C is shown below the table 76 for node C.

Figure 8:
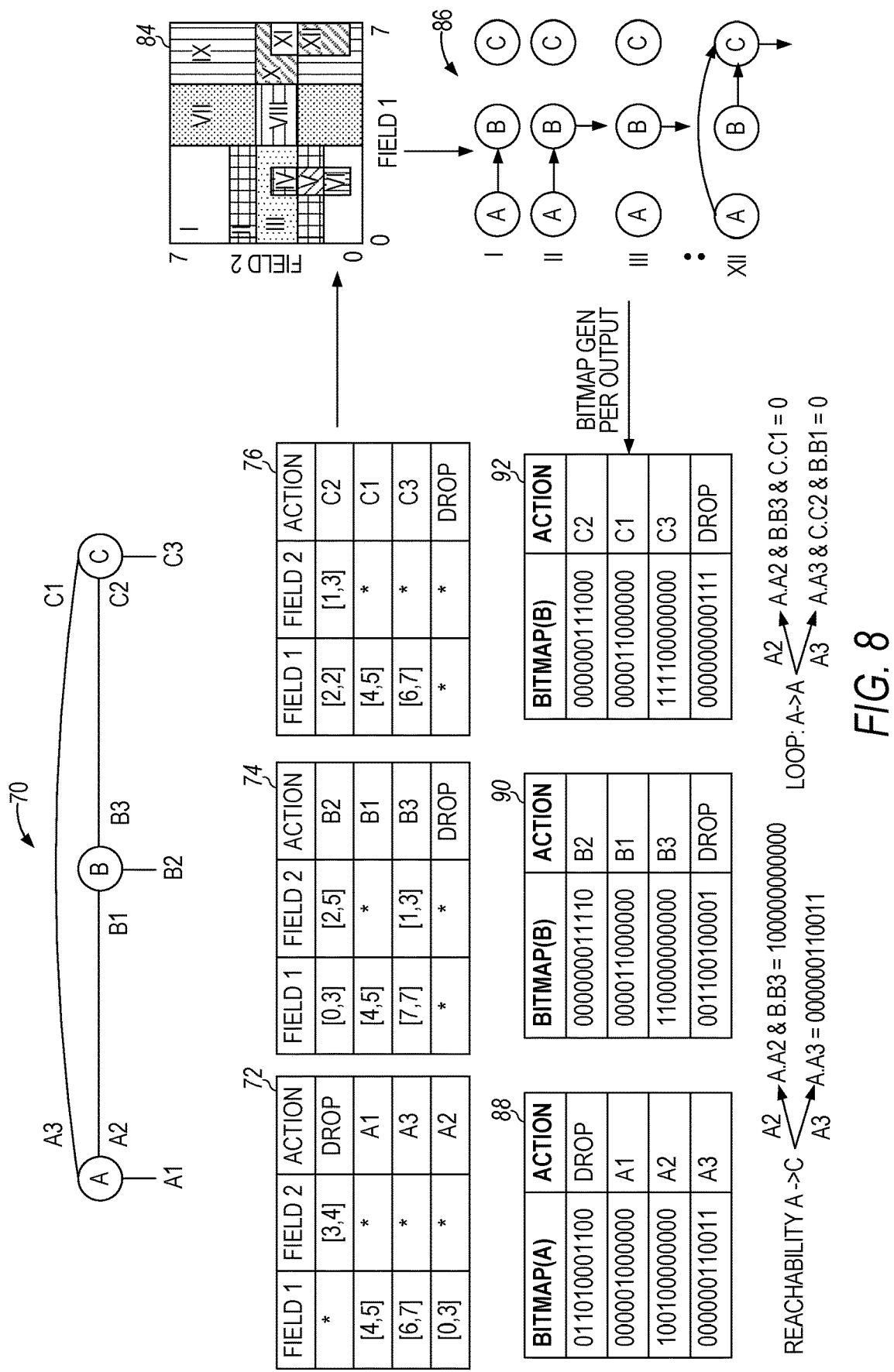
FIG. 8 illustrates how the graphs for nodes A-C generated in FIG. 7 are combined to create a compressed graphical representation for the entire sample network in a sample embodiment.

FIG. 8 illustrates how the graphs for nodes A-C generated in FIG. 7 are combined to create a compressed graphical representation for the entire sample network. In this example, the respective EC graphs 78, 80, 82 for nodes A, B and C are overlapped to create the combined EC graph 84 illustrating the network-wide packet behaviors for the 12 different combinations of overlapping rules that create ECs labeled as I-XII. In other words, the sample network 70 supports 12 different packet behaviors represented by 12 different ECs. It will be appreciated that there is one path through the network for each EC. The resulting combined EC graph 84 indicates that in the illustrated network 70 all data bits in EC I are dropped, while the packet behaviors of the remaining data packets are governed by the ECs II-XII as indicated.

The atomic flows 86 through nodes A, B, and C of the sample network 70 is illustrated below the combined EC graph 84 for the sample network 70. The atomic flows 86 are converted to bitmaps 88, 90, 92 on a per port basis for each node as illustrated in the middle of FIG. 8. In the illustrated bitmaps 88, 90, 92 for nodes A, B, and C, respectively, each row in the bitmap represents a rule with a corresponding action and a bit in the bitmap represents one of the 12 ECs from least significant bit to most significant bit where the actions are to output the packet in compliance with the indicated action or to drop the packet. A "1" is provided in a bitmap 88, 90, 92 for an EC covered by a rule, where the ECs are numbered I-XII from right to left.

Thus, bitmap(A) 88 indicates that rule 1 has a match for ECs III, IV, VIII, X, and XI and the bits are dropped, which corresponds to the "drop" portion of the EC graph 78 for bitmap A in FIG. 7. Similarly, rule 2 (A1) is matched for EC VII for bitmap A (rule 1 has priority over EC VIII); rule 3 (A2) is matched for ECs IX and XII for bitmap A (rule 1 has priority over ECs X and XI); and rule 4 (A3) is applied for ECs I, II, V, and VI for bitmap A (rule 1 has priority over ECs III and IV).

Bitmap(B) 90 indicates that rule 1 (B2) has a match for ECs II, III, IV, and V for bitmap B in FIG. 7. Similarly, rule 2 (B1) is matched for EC VII and VIII for bitmap B; rule 3 (B3) is matched for ECs XI and XII for bitmap B; and rule 4 (drop) is matched for ECs I, VI, IX, and X for bitmap B.

Finally, bitmap(C) 92 indicates that rule 1 (C2) has a match for ECs IV, V, and VI for bitmap C in FIG. 7. Similarly, rule 2 (C1) is matched for EC VII and VIII for bitmap C; rule 3 (C3) is matched for ECs IX, X, XI and XII for bitmap C; and rule 4 (drop) is matched for ECs I, II, and III for bitmap C.

These bitmap representations of the network configuration allow for a compact representation of the entire network in a way that greatly facilitates network verification. For example, as shown at the bottom of FIG. 8, to determine reachability from node A directly to node C via path A3, one selects the bitmap 000000110011 for port A3, indicating that ECs I, II, V, and VI reach node C through this path. On the other hand, the path from node A to node C via node B is determined by logically ANDing the bitmaps for ports A2 (100100000000) and B3 (110000000000), to produce a result bitmap of 100000000000. Thus, only EC XII reaches node C through ports A2 and B3.

To determine if a loop exists from node A back to node A, the paths from node A back to node A are logically ANDed. In the network 70, if one starts with port A2 (100100000000), one also ANDs with the bitmap for port B3 (110000000000) and the bitmap for return path C1 (000011000000). Since there is no EC for which all of these bitmaps have a value of 1, the AND of these bitmaps is 0, indicating that no loop exists. Similarly, starting with port A3 (000000110011), one also ANDs with the bitmap for port C2 (000000111000) and the bitmap for port B1 (000011000000). Once again, there is no EC for which all of these bitmaps have a value of 1, so the AND of these bitmaps is 0, indicating that no loop exists. If a "1" exists for any EC, then a loop would exist.

Similar calculations may be performed to determine other indicators of network status such as isolation (no reachability between A and B), black holes (no flow starts from A), waypoints (all reachability paths from A to B must go through C), consistency, link up/down, etc. by determining whether an EC connects to the identified node or not.

This same technique may be applied for much more sophisticated network examples. It will be appreciated that in each case the computation is a simple logical AND, which if very fast and simple, thus allowing for real-time computation. The example above provides a common workflow to generate ECs. The key is how to generate ECs, with the same input, as there are many different approaches to generate different EC sets.

For networking verification optimization, the compressed data structure described herein also may be used to store forwarding rules. For example, for each atomic flow 86 is a BDD (Binary Decision Diagram), covering a disjoint set. Each BDD generates tries, which branch on one bit (or several bits) at a time. As illustrated in the simple example shown in FIG. 9A, each node in the BDD 94 represents an atomic flow (AF), which equals its value minus its children's value. It will be appreciated that while existing approaches, such as those used by Veriflow, would generate 5 atomic values, the approach described herein only generates 3 atomic values AF1, AF2, and AF3 for the example illustrated in FIG. 9A. Such simplification makes it much faster and easier to add/remove rules and to verify same in a network.

Figure 9A:
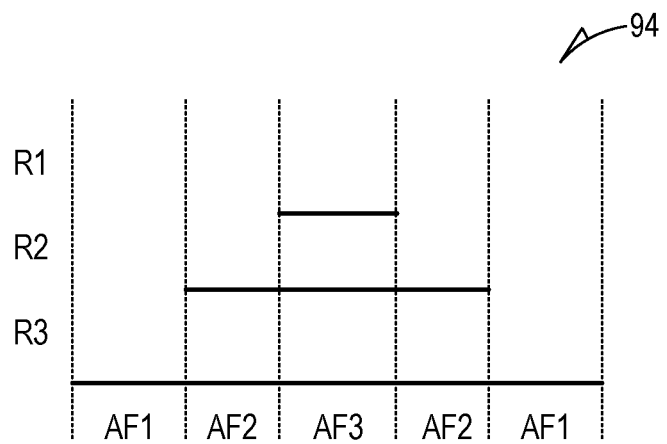
FIG. 9A illustrates the compressed data structure for storing forwarding rules r1, r2, and r3 in a sample embodiment.

In the simple example of FIG. 9A, rules r1, r2, and r3 are provided, where r1 has priority over r2 and r2 has priority over r3. The rules may be matched to prefixes as follows:
r1: 011 10 10
r2: 011 10**
r3: 011 
and an EC is generated for each AF.

Figure 9B:
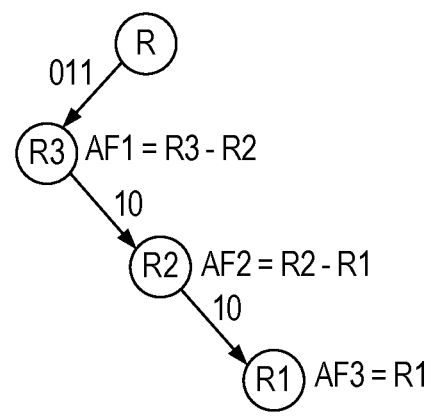
FIG. 9B illustrates the corresponding trie for the example of FIG. 9A.

FIG. 9B illustrates the corresponding trie 95 for this example. As illustrated, each rule R has prefix 011 in common. Each node represents its rules minus rules in its children nodes. Child node R3 corresponds to AF1, where AF1=R3−R2. Thus, rules R1 and R2 have prefix 01110 in common. Child node R2 corresponds to AF2, where AF2=R2−R1. Thus, rule R1 is the only rule with the prefix 0111010 to node R1, which corresponds to AF3 (i.e., AF3=R1). In this fashion, only 3 ECs may represent all Header Space of the packet header in the network configuration.

Figure 10A:
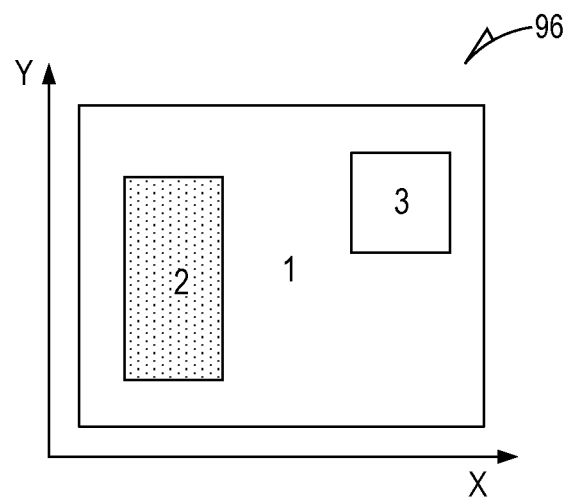
FIG. 10A illustrates the compressed data structure for storing access control list rules 1, 2, and 3 in a sample embodiment.
Figure 10B:
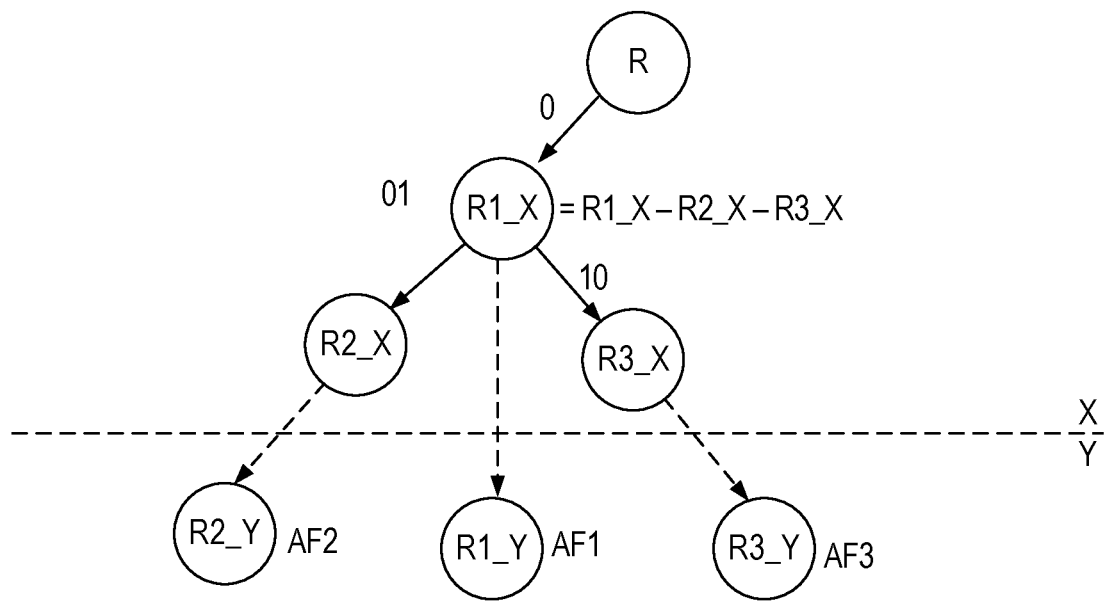
FIG. 10B illustrates the corresponding trie for the example of FIG. 10A.

For networking verification optimization, the compressed data structure described herein may also be extended to store ACL rules. A simple example is illustrated in FIG. 10A and FIG. 10B. As in the case of using a BDD to store forwarding rules, a BDD is used to generates tries, which branch on one bit (or several bits) at a time. As illustrated in the simple example shown in FIG. 10A, each node represents an atomic flow (AF), which is equal to its value minus its children's value. It will be appreciated that while existing approaches such as Veriflow will generate 25 atomic values, the approach disclosed herein only generates 3 atomic values.

In the example illustrated in FIG. 10A, three different rules 1, 2, and 3 for prefix fields represented along the x and y axes, respectively, are illustrated as EC graph 96. FIG. 10B illustrates the corresponding trie 97 for this example. As illustrated, each rule has prefix 0 in common. Child node R1_$x$=R1_$x$−R2_$x$−R3_$x$ represents the first rule along the x axis (source), while R1_$y$ corresponds to AF1 along the y axis (destination). Child node R2_$x$=R2_$x$−R3_$x$ represents the second rule along the x axis (source), while R2_$y$ corresponds to AF2 along the y axis (destination). Child node R2_$x$ has prefix 001. Child node R3_$x$=R3_$x$−R2_$x$ represents the third rule along the x axis (source), while R3_$y$ corresponds to AF3 along the y axis (destination). In this fashion, only 3 ECs (AF1, AF2, AF3) may represent all of the Header Space in the packet header of the network configuration, as opposed to the 25 ECs that would be required by Veriflow, for example 5 slides (X axis)*5 slides (y axis)=25.

The compressed data structure described herein may also support a middle box model. In the case of a middle box, each input port is guarded by an ACL predicate and each output port is guarded by a forwarding predicate followed by an ACL predicate.

Figure 11:
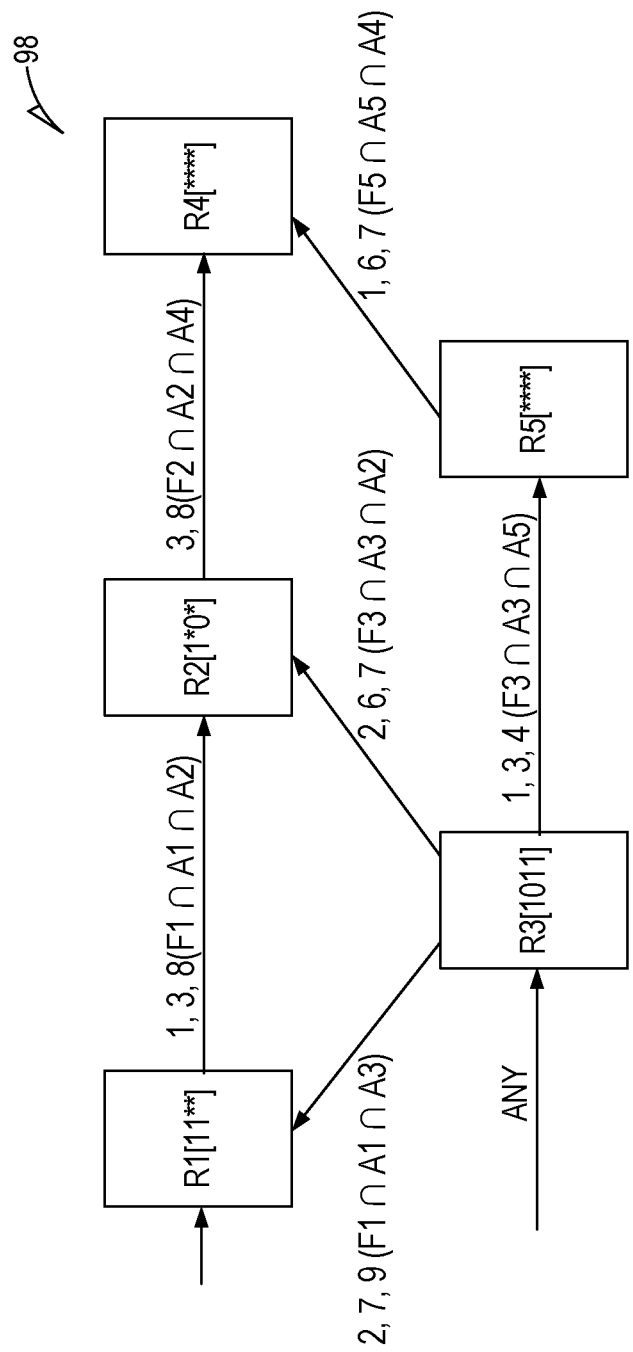
FIG. 11 illustrates a port-based directed shared dependency graph in a sample embodiment.

FIG. 11 illustrates a port-based directed shared dependency graph 98. This directed shared dependency graph is used to generate Teachability trees starting from every device port. In FIG. 11, each directed edge from the source to destination includes ECs generated by forwarding rules (e.g., F1, F2, F3, and F5) and the outport ACL (e.g., A1, A2, A3, and A5) from the source and the inport ACL (e.g., A2, A3, A4, and A5) from the destination, where, for example, (F1∩ A1∩ A2) for the path from R1 to R2 indicates forwarding table F1, outport ACL A1, inport ACL A2 for ECs 1, 3, and 8. In order to reduce computation complexity of reachability trees generation, some information is maintained to avoid recalculation between different reachability trees calculations. Each router keeps a map to record reachability between its inports and outports, where: 1 (need to calculate, but do not need to update this information): reach; 0: unreach (do not need to compute in future reachability tree generation);*don't know (need to calculate, need to update to 0 or 1 if possible). This approach has the advantage that local computation can be reused in reachability tree generation, further enabling fast link up/down calculations.

An example of original rules is shown in Table 2 below, each EC is generated or affected by one or multiple rules:

TABLE 2

| Atomic Number (EC) | Rules |
|---|---|
| 1 | r2, r4 |
| 2 | r5 |
| 3 | r8 |
| 4 | r3 |
| 5 | r11 |
| 6 | r9 |
| 7 | r1, r4 |
| 8 | r6, r8 |
| 9 | r4 |

Figure 12:
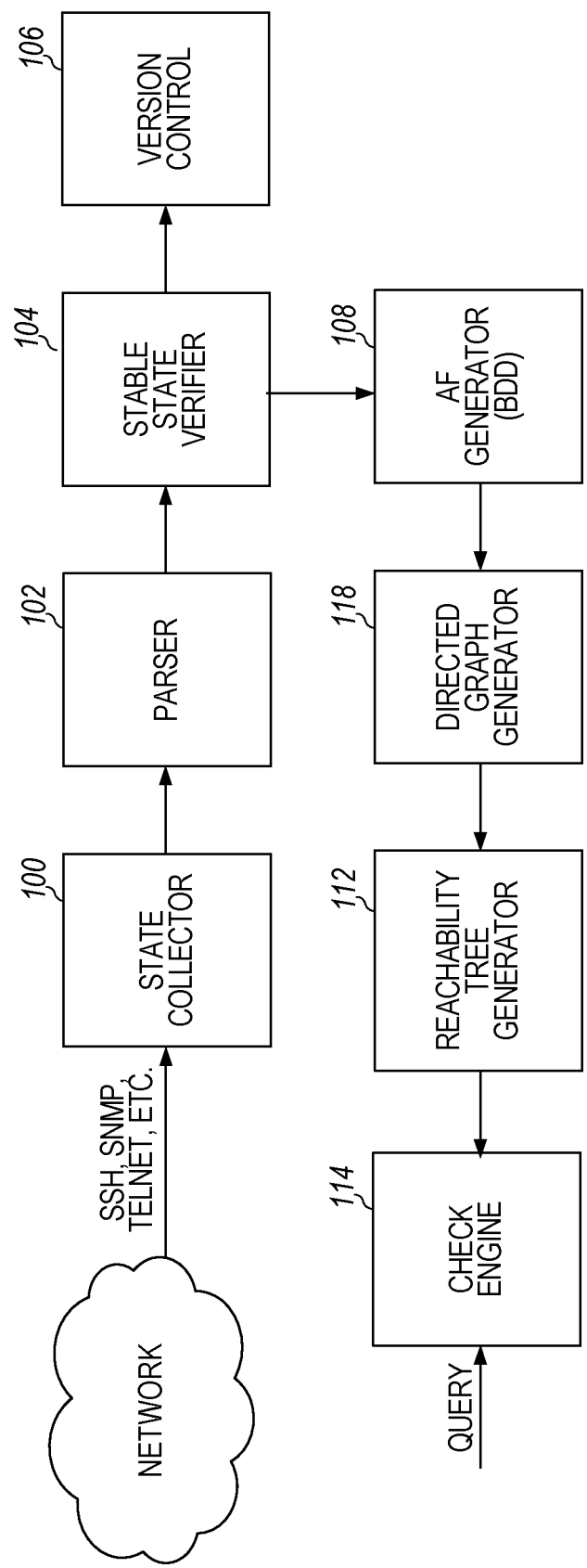
FIG. 12 illustrates the overall trie-based data-plane verification architecture of a sample packet network.

As noted above, each atomic flow is a BDD (Binary Decision Diagrams), covering a disjoint set. For incremental verification, BDD operation is needed. As noted above, BDDs generates tries, which branch on one bit (or several bits) at a time. A packet network is modeled as a directed graph of boxes. For example, FIG. 12 illustrates the overall trie-based data-plane verification architecture of a sample packet network. As noted above, the input data is collected from network devices 99 using simple network management protocol (SNMP), secure shell (SSH) cryptographic network protocol, Telnet, and the like. A state collector 100 receives a network topology snapshot and collects state information from the snapshot. The state collector 100 also compares two continuous stable snapshots and only sends the difference to the parser 102. The snapshot is parsed by parser 102, and the parsed information is verified by stable state verifier 104 that performs the functions of the verify engine 40 noted above with respect to FIG. 3. The output of the stable state verifier 104 is provided to version control device 106 to establish version control of the received information. The verified stable state information is used by AF generator (BDD) 108 to generate AFs such as those described above with respect to FIG. 8. The AFs are provided to directed graph generator 110 to generate directed graphs and to reachability tree generator 112 to generate reachability trees using the methods described above with respect to FIG. 8, FIG. 9, and FIG. 10. The directed graphs and reachability trees are provided to the check engine 114, which can be queried to generate reports regarding network status, as described above with respect to FIG. 3.

Figure 13:
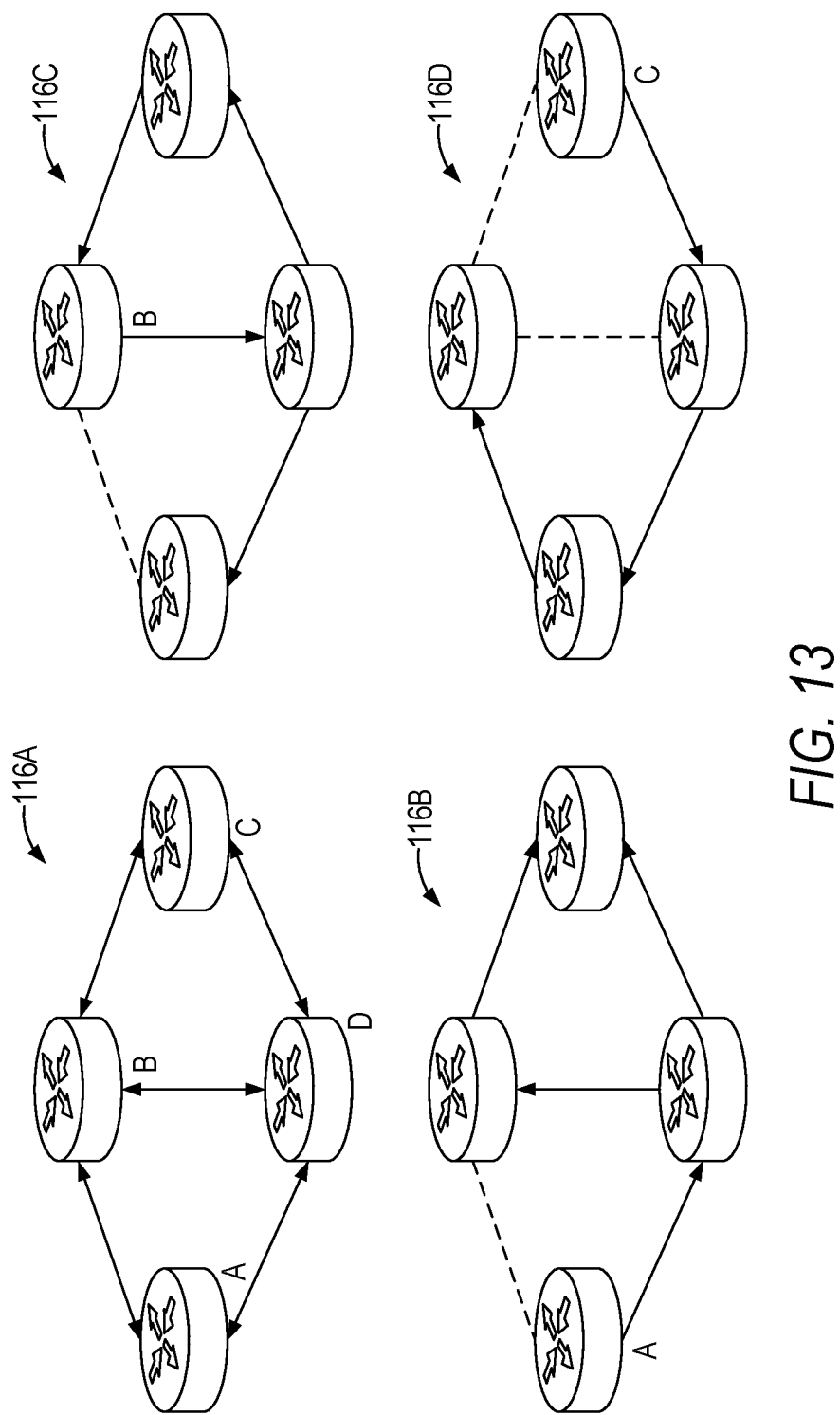
FIG. 13 illustrates reachability trees generated by a reachability tree generator for each port of each network device in a sample embodiment.

Queries to the check engine 114 relate to the status of the network. For example, the queries may include reachability, loop detection, isolation, and the like. By recognizing that reachability is fundamental, the techniques described herein may be used to combine the queries and to reuse reachability results whereby a reachability tree for each port may be built and stored as the trie is being built, thereby reducing the complexity of the network from $O(N^2)$ to $O(N)$, where N is the number of ports. For example, a reachability tree may be generated by reachability tree generator 112 for each port of each network device as illustrated in FIG. 13. Reachability tree 115a shows the overall topology, while reachability trees 115b, 115c, and 115d show the reachability trees starting from ports A, B, and C, respectively. The port A, B, and C reachability trees show that loop detection is based on the reachability tree for every port to find a loop, while isolation is also based on the reachability tree for every port. All ports including inbound and outbound are calculated. For access ports, all input is considered, while for other ports, filtered input from a port-based Directed Dependency Graph is used.

Figure 14:
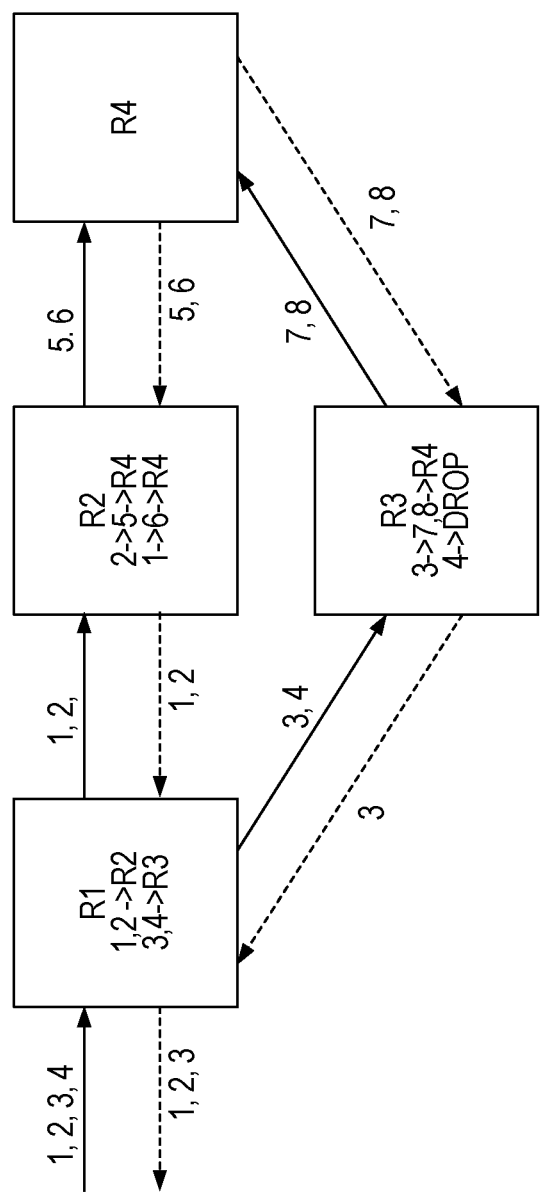
FIG. 14 illustrates an example for generation of port A, B, and C's reachability trees in the sample embodiment of FIG. 13.

Packet header modification and packet encapsulation/decapsulation are common in dynamic, non-deterministic real network devices such as network address translators (NATs), but such features are not commonly supported by existing approaches to network verification. In accordance with the systems and methods described herein, atomic flows are calculated based on information before and after header modification, which usually increases the number of atomic flows. The atom flow is traced to determine which atom flow can go through which path and its state modification. As shown in FIG. 14, a network 116 of four network devices R1-R4 with modification rules R1-R4. As illustrated, all atomic flows 1-4 are input to R1. The atomic flows 1-4 are modified to become atomic flows 5-8 as illustrated. Trace back of which atom flow can go through which path and its state modification is shown as dashed arrows in FIG. 14. In the illustrated example, ECs 1,2 are passed to R2 and ECs 3,4 are passed to R3. At R2, EC 2 is passed to R4 as EC 5 and EC1 is passed to R4 as EC 6. As illustrated by the dashed lines, the same ECs trace back to R1. On the other hand, since R3 drops EC 4, the trace back of ECs 3,4 omits EC 4 on the return. Thus, by modeling the packet header modification using ECs, not only is the EC generated based on rules, but the EC also depends on the packet header after modification. The EC is generated based on not only rule conditions but also based on rule actions, and the dependency graph may be used to represent the modification based on the EC and can trace back to the original packet headers before modification.

Such trace back of the reachability paths is desired for two reasons:

1. Rules/Atoms are modified along the paths, so there is a need to know that original flows/atoms from source node can reach the probe node.

2. In order to achieve real-time verification, only affected edges are updated when a rule is added, deleted, or modified.

In this example, all the edges are bidirectional, so during trace back, the reverse rules are used. Each port keeps two topology lists: to and from a particular port.

The encapsulation/decapsulation is converted into modification verification of a packet as follows:

| header3 | header2 | header1 | Original header | Packet payload |
|---------|---------|---------|-----------------|----------------|

A stack is used to store auxiliary headers, and the stack length is finite. In this example, push_vlan, strip_vlan, and mod_vlan_vid become VLAN modification. For VLAN, an open vswitch (OVS), which is a distributed virtual multi-layer network switch, supports only a single VLAN header in any case. For VXLAN, the outer header and inner headers are treated as different data fields.

In the examples described above with respect to FIGS. 7-8, bitmaps 88, 90, 92 are used to store ECs and bit operations of the bitmaps 88, 90.92 are used to calculate reachability, loop, isolation, etc. Also, different tree data structures are used to store and generate ECs with prefix as input, where each node represents its value minus the value of its children nodes. For ACL rules, a different tree data structure is used to store and generate ECs. Each node represents an AF, which equals its value minus its children's value. As a result, unlike the prior art Veriflow system where each EC generates its own forwarding graph, a compressed representation of the forwarding graphs may be provided.

Figure 15:
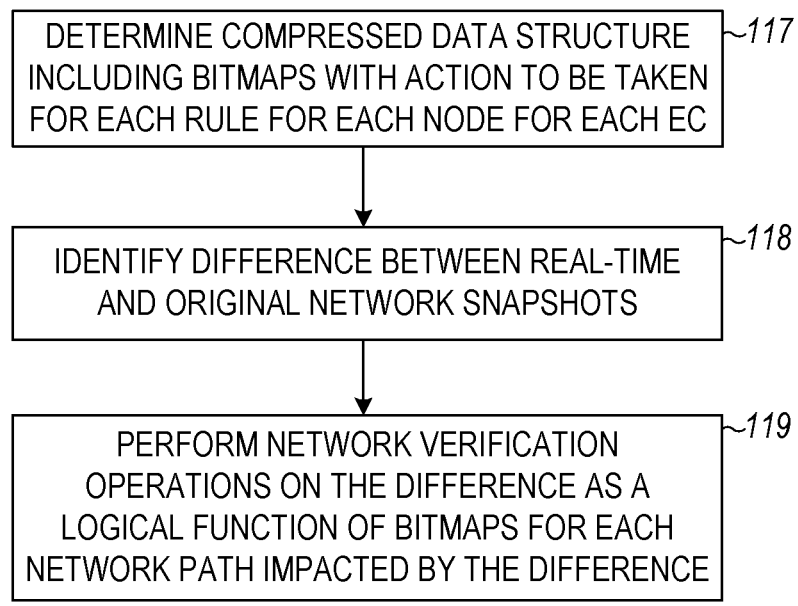
FIG. 15 illustrates a sample embodiment of a method for verifying a network state in real-time in a sample embodiment.

FIG. 15 illustrates a sample embodiment of a method for verifying a network state in real-time in a sample embodiment. The method is implemented by a network unit, such as a router, that includes a software module that determines a compressed data structure representing header spaces of data packets in an original snapshot of the network and in a real-time snapshot of the network at 117. The compressed data structure includes respective bitmaps indicating for each rule for each node an action to be taken for each equivalence class (EC) of data packets in the network. The respective bitmaps store bits indicating for each rule whether or not the rule applies to the respective ECs of data packets in the network. Another software module compares the real-time snapshot to the original snapshot of the network at 118 to identify a difference between the real-time snapshot and the original snapshot of the network. Yet another software module performs network verification operations on the difference at 119 as a logical function of a bitmap corresponding to each network path impacted by the difference. As noted above, such network verification operations may include determining reachability, detecting loops, isolation, black holes, and waypoints, determining consistency, up/down links, and the like. In sample embodiments, the network unit may further include one or more hardware or firmware elements or software modules for performing any one or a combination of steps as described in the respective embodiments.

The model described herein describes all network devices, including packet header modification (transformer), which is not supported by all existing approaches. Instead, a port based forwarding graph uses only one shared forwarding graph instead of one forwarding graph per EC. Use of a port based forwarding graph thus saves a lot of memory for a large-scale network. Also, the disclosed system and method provides packet header modification and traceback, which is not supported by existing approaches because such approaches assume the ECs will not change when passing through network devices, which is not true in a real network.

The system and method described herein thus has many advantages over prior network verification systems. For example, the disclosed system and method pre-computes a compressed data structure representing the relevant header spaces instead of the "run-time" compression, thereby saving time, saving memory usage, and avoiding redundant computing. These compact data structures store rules and generate less atomic flows. Also, different data structures are provided for forwarding rules and ACL rules because they have very different properties and achieve better performance and less memory consumption. Port-based forwarding graphs are used instead of rule-based or node-based forwarding graphs. The resulting system allows faster incremental verification instead of recalculation and can easily verify reachability, loop detection and isolation at the same time with the reachability tree database and can provide a fast query about reachability between any two nodes, which improves the ease of debugging. The systems and methods described herein thus can achieve real-time checking and monitoring of the status of a network based on the network operator's intent. Calculated values are reused for better performance and stored in a bitmap for taking up less memory.

Figure 16:
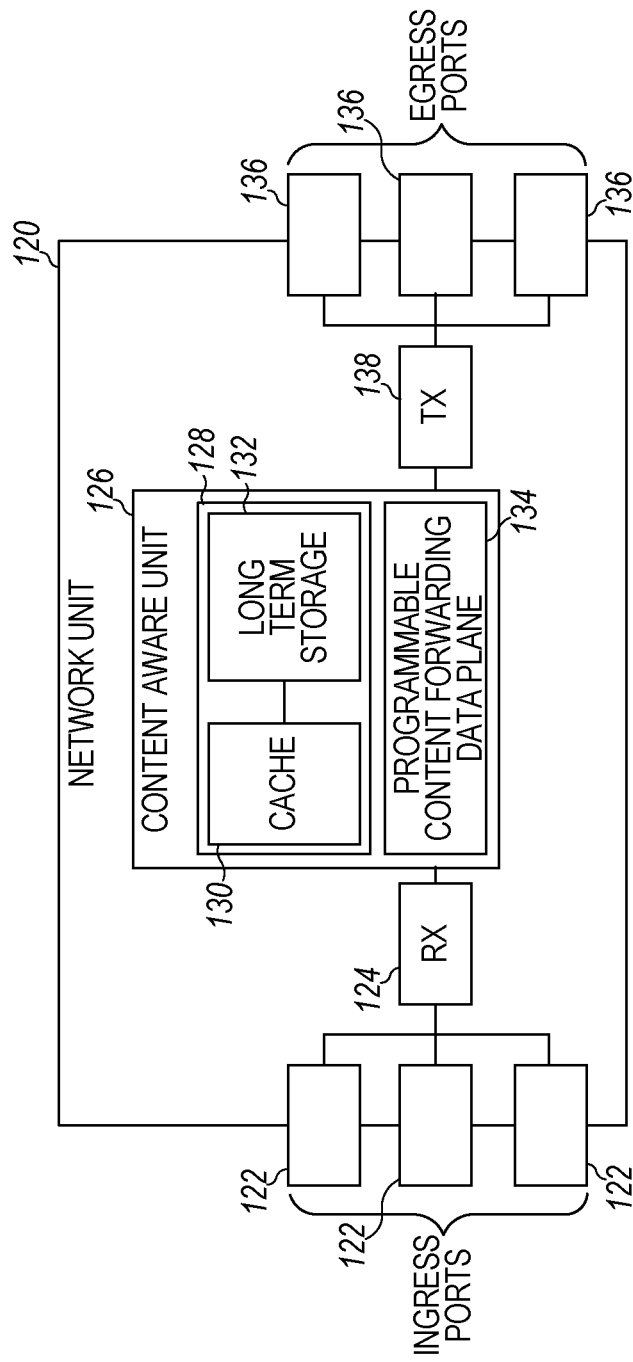
FIG. 16 illustrates an embodiment of a network unit in a sample embodiment.

FIG. 16 illustrates an embodiment of a network unit 120, which may be any device that transports and processes data through a network such as sample network 70 described above. For instance, the network unit 120 may correspond to or may be located in any of the network system nodes described above. The network unit 120 may also be configured to implement or support the schemes and methods described above. The network unit 120 may comprise one or more ingress ports or units 122 coupled to a receiver (Rx) 124 for receiving signals and frames/data packets from other network components. The network unit 120 may comprise a content aware unit 126 to determine which network components to send content to. The content aware unit 126 may be implemented using hardware, software, or both. The network unit 120 may also comprise one or more egress ports or units 136 coupled to a transmitter (Tx) 138 for transmitting signals and frames/data packets to the other network components. The receiver 124, content aware unit 126, and transmitter 138 may also be configured to implement at least some of the disclosed schemes and methods above, which may be based on hardware, software, or both. The components of the network unit 120 may be arranged as shown in FIG. 16 or arranged in any other configuration.

The content aware unit 126 may also comprise a programmable content forwarding data plane block 134 and one or more storage blocks 128 that may be coupled to the programmable content forwarding data plane block 134. The programmable content forwarding data plane block 134 may be configured to implement content forwarding and processing functions as described herein, such as at an application layer where the content may be forwarded based on content name or prefix and possibly other content related information that maps the content to network traffic. Such mapping information may be maintained in one or more content tables (e.g., CS, PIT, and FIB) at the content aware unit 126 or the network unit 120. The programmable content forwarding data plane block 134 may interpret user requests for content and accordingly fetch content, e.g., based on metadata and/or content name (prefix), from the network or other content routers and may store the content, e.g., temporarily, in the storage blocks 128. The programmable content forwarding data plane block 134 may then forward the cached content to the user. The programmable content forwarding data plane block 134 may be implemented using software, hardware, or both and may operate above the IP layer.

The storage blocks 128 may comprise a cache 130 for temporarily storing content, such as content that is requested by a subscriber. Additionally, the storage blocks 128 may comprise a long-term storage 132 for storing content relatively longer, such as content submitted by a publisher. For instance, the cache 130 and the long-term storage 132 may include dynamic random-access memories (DRAMs), solid-state drives (SSDs), hard disks, or combinations thereof.

In a sample implementation of content aware unit 126, the network verification described herein can be performed by means of receiver 124, content aware unit 126 including programmable content forwarding data plane block 134 and one or more storage blocks 128, and transmitter 138 that together process signals and/or frame/data packets as describe above with reference to FIG. 16, where the signals and/or frame/data are indicative of IP address and/or namespace, a request, and/or content.

Figure 17:
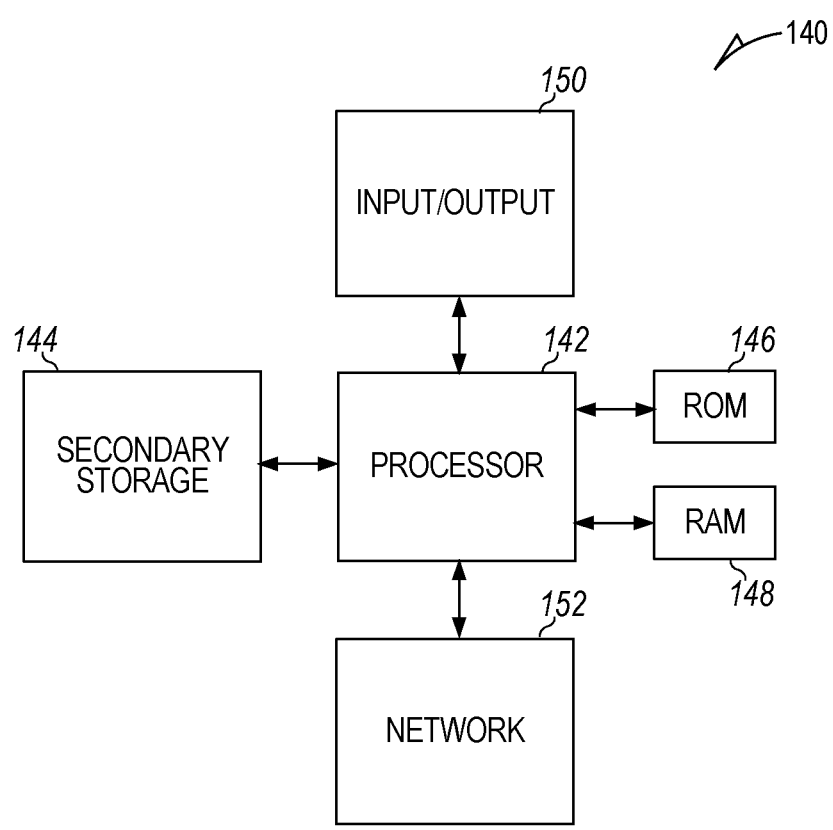
FIG. 17 illustrates a typical, general-purpose network component suitable for implementing one or more embodiments of the network unit processing elements.

FIG. 17 illustrates a typical, general-purpose network component 140 suitable for implementing one or more embodiments of the components disclosed herein. The network components described above may be implemented on any general-purpose network component, such as a computer or network component with sufficient processing power, memory resources, and network throughput capability to handle the necessary workload placed upon it. The network component 140 includes a processor 142 (which may be referred to as a central processor unit or CPU) that is in communication with memory devices including secondary storage 144, read only memory (ROW) 146, random access memory (RAM) 148, input/output (I/O) devices 150, and network connectivity devices 152. The processor 142 may be implemented as one or more CPU chips, or may be part of one or more application specific integrated circuits (ASICs).

The secondary storage 144 is typically comprised of one or more disk drives or tape drives and is used for non-volatile storage of data and as an over-flow data storage device if RAM 148 is not large enough to hold all working data. Secondary storage 144 may be used to store programs that are loaded into RAM 148 when such programs are selected for execution. The ROM 146 is used to store instructions and perhaps data that are read during program execution. ROM 146 is a non-volatile memory device that typically has a small memory capacity relative to the larger memory capacity of secondary storage 144. The RAM 148 is used to store volatile data and perhaps to store instructions. Access to both ROM 146 and RAM 148 is typically faster than to secondary storage 144.

It should be understood that servers, routers, and/or any or all of the devices within consumer and/or producer domains as described herein can be configured to comprise a registration, routing and resolution logic including computer-readable non-transitory media storing computer readable instructions and one or more processors couple to the memory, and when executing the computer readable instruction configured to perform method steps and operations described in the disclosure with reference to FIG. 1 to FIG. 16. The computer-readable non-transitory media includes all types of computer readable media, including magnetic storage media, optical storage media, flash media and solid state storage media.

It should be further understood that software including one or more computer-executable instructions that facilitate processing and operations as described above with reference to any one or all of steps of the disclosure can be installed in and sold with one or more servers and/or one or more routers and/or one or more devices within consumer and/or producer domains consistent with the disclosure. Alternatively, the software can be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. A sample storage medium is coupled to the processor such the processor can read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 1330, such that the instructions, when executed by one or more processors 1330 cause the one or more processors 1330 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method of verifying a state of a network comprising a plurality of nodes having data packet forwarding rules, the method comprising:
generating, with one or more processors, at a first time, a first data structure representing a first header space of data packets in respective equivalence classes (ECs) of data packets in a first snapshot of the network;
generating, with the one or more processors, at a second time later than the first time, a second data structure representing a second header space of data packets in the respective ECs of data packets in a second snapshot of the network, each of the data structures comprising a respective bitmap indicating for each data packet forwarding rule for each node a forwarding action to be taken for each EC of data packets in the network, the respective bitmap storing bits indicating for each data packet forwarding rule whether the data packet forwarding rule applies to the respective ECs of data packets in the network;
comparing the first snapshot with the second snapshot of the network to identify network paths that have changed between a time of the first snapshot and the second snapshot of the network; and
performing network verification operations on a changed network path of the network paths that have changed, the network verification operations utilizing a result bitmap representative of the state of the network, the result bitmap generated as a logical AND function of a bitmap at each node in the changed network path.

2. The method of claim 1, further comprising:
splitting each of the first and second header spaces into two fields FW1 and FW2 based on a combination of data packet forwarding rules used to generate respective ECs; and
combining the fields FW1 and FW2 of each of the first and second header spaces to generate a combined EC graph of network-wide packet behaviors for different combinations of overlapping data packet forwarding rules for all EC combinations for FW1 and FW2, each different combination of overlapping data packet forwarding rules representing an EC corresponding to a path through the network.

3. The method of claim 1, further comprising generating a bitmap for respective output ports of a node, the bitmap storing bits indicating which ECs apply each data packet forwarding rule at the output ports of the node.

4. The method of claim 1, further comprising checking data packet forwarding rules for at least one of the nodes one by one in a priority order until a rule match is found for a particular data packet of a particular EC.

5. The method of claim 1, wherein:
each bit in each bitmap represents one of the ECs; and
forwarding actions to be taken for each data packet for the EC comprise outputting the data packet based on a matched data packet forwarding rule or dropping the data packet.

6. The method of claim 1, wherein performing network verification operations comprises determining reachability from a first node to a second node by logically ANDing the bitmaps for each network path from the first node to the second node to produce a result bitmap, whereby a bit of the result bitmap being logical "1" for a particular EC indicates that the network path for the particular EC is a valid path from the first node to the second node.

7. The method of claim 1, wherein performing network verification operations comprises determining if a loop exists from one of the nodes through the network back to the one node by logically ANDing the bitmaps for each network path and return network path from the one node and back to the one node to produce a result bitmap, whereby a bit of the result bitmap being logical "1" for any EC indicates that a loop exists via that EC.

8. The method of claim 1, wherein the first and second data structures store data packet forwarding rules in a binary decision diagram having nodes, each node of the binary decision diagram representing an EC having a value equal to a value of the respective node minus a value of each child of the respective node, further comprising each binary decision diagram generating a trie that branches on one or more bits at a time.

9. The method of claim 1, wherein the first and second data structures store access control list rules in a binary decision diagram having nodes, each node of the binary decision diagram representing an EC having a value equal to a value of the respective node minus a value of each child of the respective node, further comprising each binary decision diagram generating a trie that branches on one or more bits at a time.

10. The method of claim 1, further comprising a router in the network storing data packet forwarding rules and access control list rules in the first and second data structures to map reachability between input ports and output ports of the router.

11. A network unit that verifies a state of a network comprising a plurality of nodes having data packet forwarding rules, the network unit comprising:

a receiver that receives data packets from the network;
a transmitter that forwards data packets to other network components
a memory that stores instructions; and
one or more processors in communication with the memory, wherein the one or more processors execute the instructions to:
generate, at a first time, a first data structure representing a first header space of data packets in respective equivalence classes (ECs) of data packets in a first snapshot of the network;
generate, at a second time later than the first time a second data structure representing a second header space of data packets in the respective Ks of data packets in a second snapshot of the network, each of the data structures comprising a respective bitmap indicating for each data packet forwarding rule for each node a forwarding action to be taken for each EC of data packets in the network, the respective bitmap storing bits indicating for each data packet forwarding rule whether the data packet forwarding rule applies to the respective ECs of data packets in the network;
compare the first snapshot with the second snapshot of the network to identify network paths that have changed between a time of the first snapshot and the second snapshot of the network; and
perform network verification operations on a changed network path of the network paths that have changed, the network verification operations utilizing a result bitmap representative of the state of the network, the result bitmap generated as a logical AND function of a bitmap at each node in the changed network path.

12. The network unit of claim 11, wherein the memory further stores instructions that when executed by the one or more processors cause the one or more processors to:
split each of the first and second header spaces into two fields FW1 and FW2 based on a combination of data packet forwarding rules used to generate respective ECs; and
combine the fields FW1 and FW2 of each of the first and second header spaces to generate a combined EC graph of network-wide packet behaviors for different combinations of overlapping data packet forwarding rules for all EC combinations for FW1 and FW2, each different combination of overlapping data packet forwarding rules representing an EC corresponding to a path through the network.

13. The network unit of claim 11, wherein the memory further stores instructions that when executed by the one or more processors cause the one or more processors to generate a bitmap for respective output ports of a node and to store bits in the bitmap indicating which ECs apply each data packet forwarding rule at the output ports of the node.

14. The network unit of claim 11, wherein the memory further stores instructions that when executed by the one or more processors cause the one or more processors to check data packet forwarding rules for at least one of the nodes one by one in a priority order until a rule match is found for a particular data packet of a particular EC.

15. The network unit of claim 11, wherein:
each bit in each bitmap represents one of the ECs; and
forwarding actions to be taken for each data packet for the EC comprise outputting the data packet based on a matched data packet forwarding rule or dropping the data packet.

16. The network unit of claim 11, wherein the memory further stores instructions that when executed by the one or more processors cause the one or more processors to determine reachability from a first node to a second node in the network by logically ANDing the bitmaps for each network path from the first node to the second node to produce a result bitmap, whereby a bit of the result bitmap being logical "1" for a particular EC indicates that the network path for the particular EC is a valid path from the first node to the second node.

17. The network unit of claim 11, wherein the memory further stores instructions that when executed by the one or more processors cause the one or more processors to determine if a loop exists from one of the nodes through the network back to the one node by logically ANDing the bitmaps for each network path and return network path from the one node and back to the one node to produce a result bitmap, whereby a bit of the result bitmap being logical "1" for any EC indicates that a loop exists via that EC.

18. The network unit of claim 11, wherein the memory further stores instructions that when executed by the one or more processors cause the one or more processors to store the first and second data structures with data packet forwarding rules in a binary decision diagram having nodes, each node of the binary decision diagram representing an EC having a value equal to a value of the respective node minus a value of each child of the respective node, and to generate a trie from each binary decision diagram that branches on one or more bits at a time.

19. The network unit of claim 11, wherein the memory further stores instructions that when executed by the one or more processors cause the one or more processors to store the first and second data structures with access control list rules in a binary decision diagram having nodes, each node of the binary decision diagram representing an EC having a value equal to a value of the respective node minus a value of each child of the respective node, and to generate a trie from each binary decision diagram that branches on one or more bits at a time.

20. A non-transitory computer-readable media storing computer instructions implementing verification of a state of a network comprising a plurality of nodes having data packet forwarding rules, that when executed by one or more processors, cause the one or more processors to perform the steps of:

generating, at a first time, a first data structure representing a first header space of data packets in respective equivalence classes (ECs) of data packets in a first snapshot of the network;

generating, at a second time later than the first time, a second data structure representing a second header space of data packets in the respective ECs of data packets in a second snapshot of the network, each of the data structures comprising a respective bitmap indicating for each data packet forwarding rule for each node a forwarding action to be taken for each EC of data packets in the network, the respective bitmap storing bits indicating for each data packet forwarding rule whether the data packet forwarding rule applies to the respective ECs of data packets in the network;

comparing the first snapshot with the second snapshot of the network to identify network paths that have changed between a time of the first snapshot and the second snapshot of the network; and performing network verification operations on a changed network path of the network paths that have changed, the network verification operations utilizing a result bitmap representative of the state of the network, the result bitmap generated as a logical AND function of a bitmap at each node in the changed network path.

* * * * *

UNITED STATES PATENT AND TRADEMARK OFFICE
CERTIFICATE OF CORRECTION

PATENT NO. : 10,778,545 B2  
APPLICATION NO. : 16/040017  
DATED : September 15, 2020  
INVENTOR(S) : Sun et al.

Page 1 of 1

It is certified that error appears in the above-identified patent and that said Letters Patent is hereby corrected as shown below:

In the Claims

In Column 24, Line 12, in Claim 11, after "time", insert --,--

In Column 24, Line 14, in Claim 11, delete "Ks" and insert --ECs-- therefor

Signed and Sealed this  
Twenty-fourth Day of November, 2020

Andrei Iancu  
*Director of the United States Patent and Trademark Office*